US012194423B2

(12) United States Patent
Tonn et al.

(10) Patent No.: US 12,194,423 B2
(45) Date of Patent: Jan. 14, 2025

(54) BEVERAGE CONTAINER LID AND BEVERAGE CONTAINER USING SAME

(71) Applicant: Toddy Tech, LLC, Bozeman, MT (US)

(72) Inventors: Andrew Lance Tonn, Bozeman, MT (US); Stephen Mark Sanford, Bozeman, MT (US); Demri Anna Horton, Bozeman, MT (US); Leo Eugene Zugner, II, Bozeman, MT (US)

(73) Assignee: Toddy Tech, LLC, Bozeman, MT (US)

( * ) Notice: Subject to any disclaimer, the term of this patent is extended or adjusted under 35 U.S.C. 154(b) by 115 days.

(21) Appl. No.: 18/144,130

(22) Filed: May 5, 2023

(65) Prior Publication Data

US 2024/0109045 A1 Apr. 4, 2024

Related U.S. Application Data

(60) Provisional application No. 63/412,262, filed on Sep. 30, 2022.

(51) Int. Cl.
*B01F 33/501* (2022.01)
*B65D 43/02* (2006.01)
(Continued)

(52) U.S. Cl.
CPC .... *B01F 33/50111* (2022.01); *B65D 43/0225* (2013.01); *B65D 43/26* (2013.01); *B65D 47/065* (2013.01); *B65D 47/2031* (2013.01)

(58) Field of Classification Search
CPC ........... B01F 33/50111; B65D 43/0225; B65D 43/26; B65D 47/065; B65D 47/2031
(Continued)

(56) References Cited

U.S. PATENT DOCUMENTS 2,438,906 A 4/1948 Elsas et al.
2,750,066 A 6/1956 Shekter
(Continued)

FOREIGN PATENT DOCUMENTS

CH 337304 A 3/1959
CN 86206587 U 10/1987
(Continued)

OTHER PUBLICATIONS

International Search Report and Written Opinion for Application No. PCT/2023/74806, mailed Jan. 26, 2024, 14 pages.
(Continued)

*Primary Examiner* — Jacob K Ackun
(74) *Attorney, Agent, or Firm* — George C. Rondeau, Jr.; Davis Wright Tremaine LLP

(57) ABSTRACT

A lid usable with a beverage container and a refillable reservoir positioned within the container. The lid has a mixing chamber, an additive passageway extending between the mixing chamber and the reservoir, and a beverage passageway extending between the mixing chamber and the container. A slider gate is movable between a first position closing communication between the additive passageway and the mixing chamber, but providing communication between the beverage passageway and the mixing chamber, a second position providing communication between the additive passageway and the mixing chamber, and between the beverage passageway and the mixing chamber, and a third position providing communication between the additive passageway and the mixing chamber, but closing communication between the beverage passageway and the mixing chamber. The second position comprises a plurality of selectable second gate positions, with each providing a different ratio of the permitted flow of additive and beverage to the mixing chamber.

35 Claims, 16 Drawing Sheets

(51) Int. Cl.
*B65D 43/26* (2006.01)
*B65D 47/06* (2006.01)
*B65D 47/20* (2006.01)

(58) Field of Classification Search
USPC .......................................................... 206/221
See application file for complete search history.

(56) References Cited

U.S. PATENT DOCUMENTS

| | | | | |
|---|---|---|---|---|
| 3,477,431 | A | 11/1969 | Walecka | |
| 4,449,645 | A | 5/1984 | Korwin et al. | |
| 4,979,653 | A | 12/1990 | Mon | |
| 5,325,996 | A | 7/1994 | Bannigan | |
| 5,863,126 | A | 1/1999 | Guild | |
| 6,540,112 | B1 | 4/2003 | Studnik | |
| 6,565,743 | B1 | 5/2003 | Poirier et al. | |
| 6,945,393 | B2 | 9/2005 | Cho | |
| 7,918,336 | B2 | 4/2011 | Olsen et al. | |
| 8,267,276 | B2 | 9/2012 | Francomano | |
| 8,453,834 | B2 | 6/2013 | Porter | |
| 8,453,883 | B2 | 6/2013 | Habermann et al. | |
| 8,474,611 | B2 | 7/2013 | Marco | |
| 8,613,372 | B2 | 12/2013 | Porter | |
| 8,746,476 | B1 | 6/2014 | Clause et al. | |
| 8,857,665 | B2 | 10/2014 | Owoc | |
| 8,875,926 | B2 | 11/2014 | Grajevci | |
| 9,215,954 | B2 | 12/2015 | Bennett | |
| 9,771,195 | B2 | 9/2017 | Lawson et al. | |
| 10,112,752 | B2 | 10/2018 | Tonn et al. | |
| 10,421,590 | B2 | 9/2019 | Tonn et al. | |
| 10,935,406 | B1 | 3/2021 | Tonn et al. | |
| 11,428,562 | B2 | 8/2022 | Tonn et al. | |
| 2004/0118709 | A1 | 6/2004 | Cho | |
| 2006/0175330 | A1 | 8/2006 | Richardson | |
| 2007/0102394 | A1 | 5/2007 | Olsen et al. | |
| 2008/0067084 | A1 | 3/2008 | Patterson et al. | |
| 2009/0321380 | A1 | 12/2009 | Francomano | |
| 2010/0025268 | A1 | 2/2010 | Lee et al. | |
| 2010/0037780 | A1 | 2/2010 | Pas et al. | |
| 2010/0044377 | A1 | 2/2010 | Porter | |
| 2011/0068102 | A1 | 3/2011 | Porter | |
| 2011/0089059 | A1 | 4/2011 | Lane et al. | |
| 2011/0272301 | A1 | 11/2011 | Saulle et al. | |
| 2012/0024861 | A1 | 2/2012 | Otsuka et al. | |
| 2012/0305519 | A1 | 12/2012 | Lee et al. | |
| 2013/0032778 | A1 | 2/2013 | Susaki et al. | |
| 2013/0119087 | A1 | 5/2013 | Owoc | |
| 2013/0206761 | A1 | 8/2013 | Lepace | |
| 2013/0240535 | A1 | 9/2013 | Grajqevci | |
| 2013/0327788 | A1 | 12/2013 | Roth et al. | |
| 2014/0166510 | A1 | 6/2014 | Frutin | |
| 2014/0361016 | A1 | 12/2014 | Moreau | |
| 2015/0036455 | A1 | 2/2015 | Bennett | |
| 2015/0076012 | A1 | 3/2015 | Davis et al. | |
| 2015/0342421 | A1 | 12/2015 | Harris et al. | |
| 2016/0159632 | A1 | 6/2016 | Wheatley et al. | |
| 2016/0207675 | A1 | 7/2016 | Ruhnau | |
| 2017/0274332 | A1* | 9/2017 | Gandhi | B01F 27/213 |
| 2017/0296000 | A1 | 10/2017 | Shalvi et al. | |
| 2018/0029752 | A1 | 2/2018 | Clark | |
| 2018/0186528 | A1 | 7/2018 | Tonn et al. | |
| 2018/0208363 | A1 | 7/2018 | Canziani Hoffa | |
| 2019/0308144 | A1 | 10/2019 | Mutschler et al. | |
| 2021/0048326 | A1 | 2/2021 | Tonn et al. | |
| 2022/0412786 | A1 | 12/2022 | Tonn et al. | |
| 2023/0264158 | A1* | 8/2023 | Fox | B65D 53/02<br>222/145.5 |
| 2023/0294051 | A1* | 9/2023 | Raymus | B01F 33/50111<br>366/130 |
| 2024/0138627 | A1* | 5/2024 | Wei | B01F 35/32025 |
| 2024/0226828 | A1* | 7/2024 | Kent | B65D 47/089 |

FOREIGN PATENT DOCUMENTS

| | | | |
|---|---|---|---|
| CN | 2106148 | U | 6/1992 |
| CN | 2656338 | Y | 11/2004 |
| CN | 2722804 | Y | 9/2005 |
| CN | 101984905 | A | 3/2011 |
| CN | 103767591 | A | 5/2014 |
| CN | 203709892 | U | 7/2014 |
| CN | 106255648 | A | 12/2016 |
| DE | 3411200 | C2 | 10/1987 |
| FR | 2814156 | A1 | 3/2002 |
| WO | 2015169822 | A1 | 11/2015 |

OTHER PUBLICATIONS

International Search Report and Written Opinion mailed Mar. 8, 2018, International Patent Application No. PCT/US2017/68705, filed Dec. 28, 2017, seven pages.

* cited by examiner

BEVERAGE CONTAINER LID AND BEVERAGE CONTAINER USING SAME

BACKGROUND OF THE INVENTION

Field of the Invention

The present invention is directed generally to lids for beverage containers and beverage containers using same. More particularly, the lid includes a reservoir isolated from the contents of the beverage container for holding and dispensing additive substances to be mixed with the contents of the beverage container.

Description of the Related Art

Reusable beverage containers and insulated tumbler cups and mugs are known in the art and many conventional models are available on the market. The standard models of these refillable and reusable "go-cups," travel mugs, and water bottles are typically sold with a removable lid and those removable lids typically encompass a closeable drinking aperture. Some cup models are vacuum sealed with double walls to improve insulation even further.

Insulated cups are used widely for both hot and cold beverages. Yeti® Rambler Tumblers are particularly popular and these cups work great to keep drinks cool or hot. They are also very popular for use during social functions including sporting events and outdoor adventures. Because flavoring, creamer, liquors, or spirits are used in smaller proportion to the primary beverage, there is a need to transport these additives separately from the insulated cup when one wishes to replenish the primary beverage on the go. If a cocktail is desired, an individual must carry around a flask, or some other glass or plastic container to pour liquids into the primary beverage. Furthermore, the selection and quantity of additives are a matter of personal choice, so while the primary beverages may be more readily available to refill the primary container, the additives may require transport by an individual or transport of many various containers to serve multiple individuals. Transporting additives separately from insulated containers on hot days can result in the additives becoming too warm to consume and cause the beverage with which the additive is mixed to be warmer than desired or watered down due to the melting of ice in the beverage. When on the go, measuring the right amount of an additive is challenging and can lead to undesirable proportions in the mixture of additive to the primary beverage, leaving mixed drinks either over or under poured.

Individuals have turned to employing separate containers such as flasks or mini-bar size bottles to transport spirits or liquors. Companies have begun providing flavoring and creamers in plastic-disposable servings to meet the tastes of people on the go. Prior attempts to permit the transport of beverage additives such as flavorings in conjunction with the go-cups have failed because they have universally required one-time use through the breaking of a membrane or a tearing or puncturing of a seal. While some prior art has taught to have button actuation release of the content from the compartment to the cup without removal of the lid, those attempts have required a single use of at least an additive vessel inserted within the lid. Personalization of the insertion of flavoring additives to a travel cup have been addressed only by the use of multiple compartments which require the breaking or tearing of multiple, single-use membranes. In many cases, the activation of an additive chamber results in the prevention of any further use of the entire lid so that the entire lid must be disposed.

While the multi-compartments have the ability to release only a pre-measured, set amount, they are cumbersome to operate because each compartment requires an individual releasing mechanism or the ability to turn or move the actuating mechanism to release the contents of the compartments. Much of the prior art generally teaches that discharged containers should be locked open and any additive stored in a compartment should be completely discharged upon deployment.

Many inventions must be removed in order to drink the contents of the beverage container. Other inventions have sought ways to add a small amount of additive when a container is tipped for pouring. In one example, a compartment released an additive into the outflow of a container only when the lid was properly rotated and the beverage container was horizontally tipped. While creating a compartment for an additive within the lid, these efforts have removed the ability for the lid to allow fluid transfer for direct drinking. Another invention dripped additive into the stream of a soda after a large lid and cover was attached to the exterior of a soda can. As with the prior example, the additive is only mixed with the beverage flow when it exits the container's spout. The prior art is occupied with cumbersome attachments that are difficult to manufacture and require wasteful utilization of single-use vessels or sophisticated titrating with reservoirs that are not reusable or refillable. An issue also exists as the controlling the amount of additive added when less than all is desired.

The applicants have overcome many of these issues with a product described in their U.S. Pat. Nos. 10,112,752, 10,421,590, 10,935,406, 11,428,562, and related allowed U.S. patent application Ser. No. 17/878,791 (U.S. Publication 2022-0412786).

However, it has proven desirable by some users to have a convenient way to manually vary the amount of additive from an additive reservoir being added to each variable quantity swig (i.e., to each variable quantity of beverage drunk from the beverage container as it is being drunk), such that each swig may contain a different amount of additive as selected by the user to suit the user's taste at the moment of drinking, and yet to maintain the beverage remaining in the body of the beverage container free of additive. It has also proven desirable to allow a user to selectively drink additive-free beverage from the body of the beverage container, and to selectively drink additive from the additive reservoir without it being mixed with the beverage in the body of the beverage container.

BRIEF DESCRIPTION OF THE SEVERAL VIEWS OF THE DRAWINGS

Like reference numerals have been used in the figures to identify like components.

DETAILED DESCRIPTION OF THE INVENTION

Figure 2:
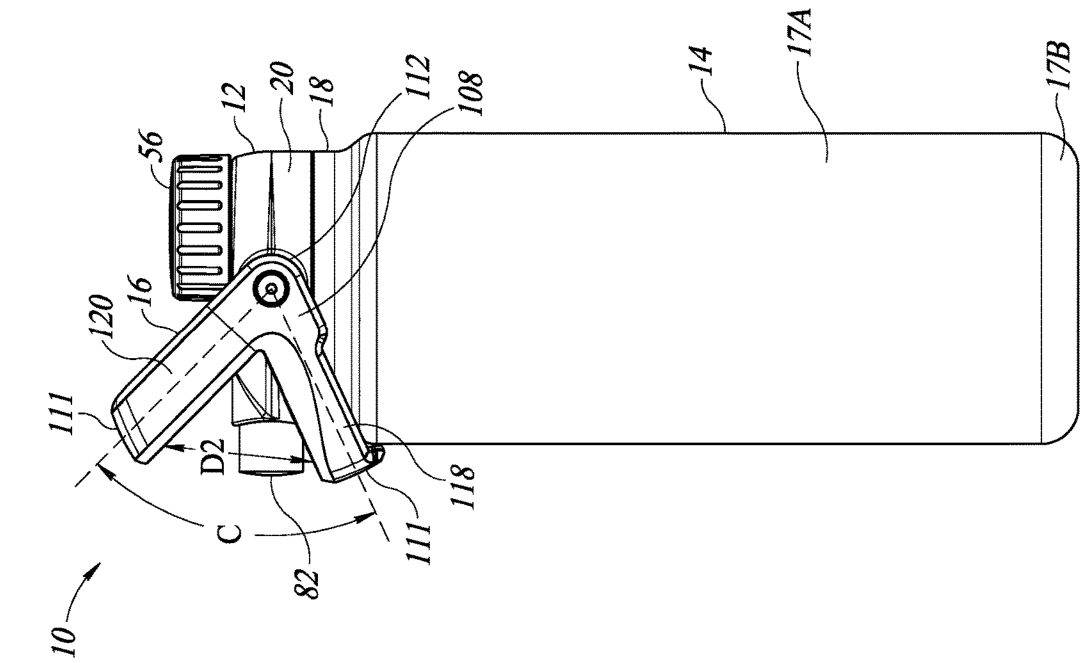
FIG. 2 is a side elevational view of the beverage container of FIG. 1 shown with the handle/lock assembly in an unlocked position.
Figure 1:
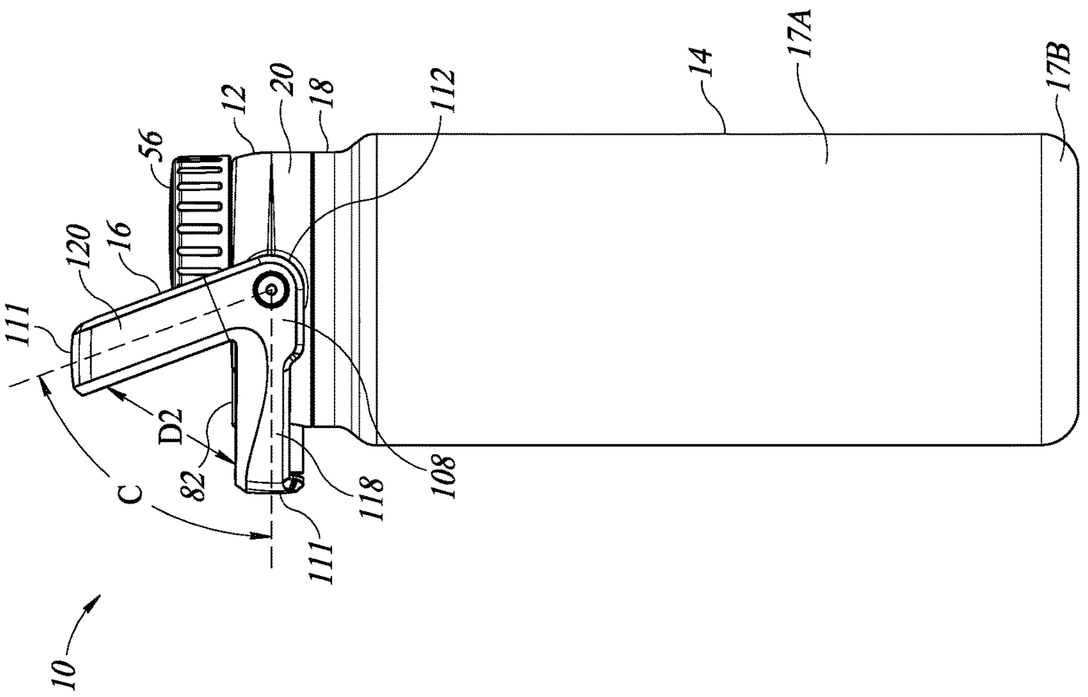
FIG. 1 is a side elevational view of a beverage container using a beverage container lid according to the present invention with a handle/lock assembly in a locked position.

A beverage container 10 using a beverage container lid 12 attached to a beverage container body 14 of the beverage container is shown in FIGS. 1 and 2 in a fully assembled state. The beverage container lid 12 shown in FIG. 1 has a handle/lock assembly 16 in a locked position ready for being carried by the handle/lock assembly, and in FIG. 2 has the handle/lock assembly in an unlocked position ready for the beverage container 10 being used to drinking a liquid/beverage stored within the beverage container body 14.

The beverage container 10 describe herein is illustrated as a drinking tumbler, but may also take the form of a glass, mug, cup, goblet, stein, tankard, vessel, beaker, drinkware, beverage ware, food container, or other vessel for containing beverages or liquid foods for drinking or consumption. The beverage container lid 12 may or may not have the handle/lock assembly 16 attached thereto. While "beverage container" and "beverage" are used herein for purposes of convenience, it is to be understood that the described beverage container 10 includes containers used for food products to which additives are to be added and not just to liquid beverages.

Figure 4:
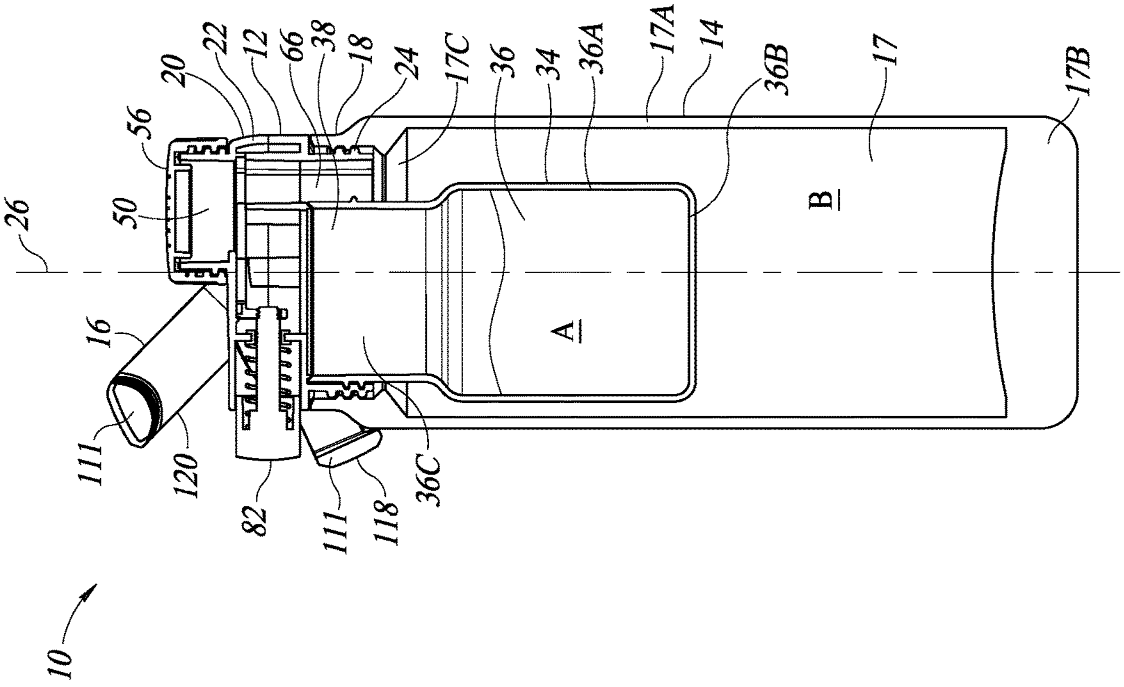
FIG. 4 is a side perspective cross-sectional view of the beverage container of FIG. 2.
Figure 3:
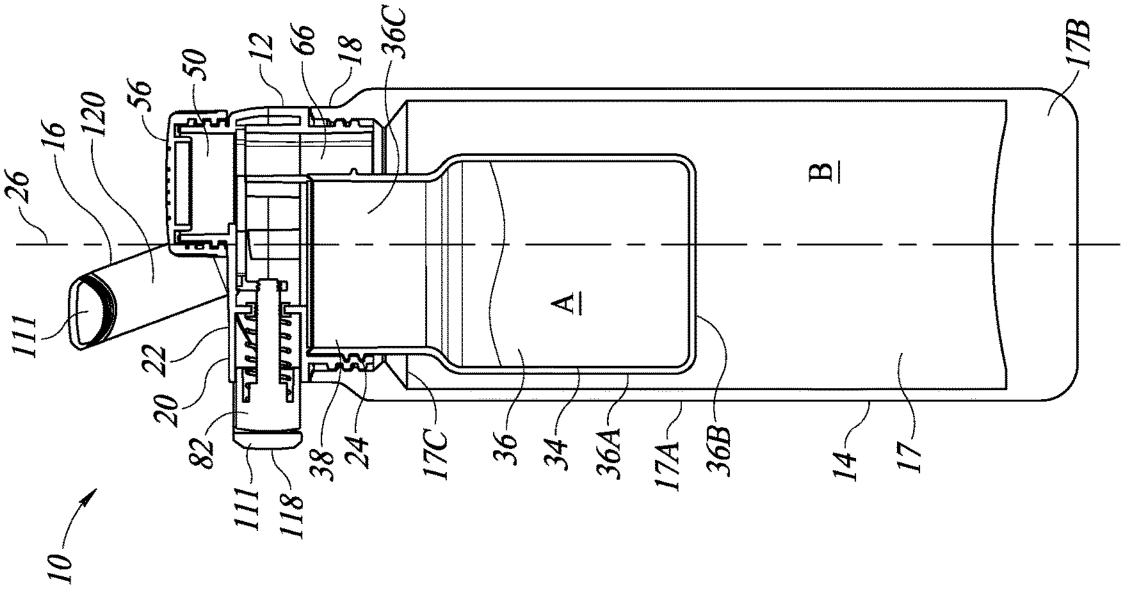
FIG. 3 is a side perspective cross-sectional view of the beverage container of FIG. 1.

As shown in FIGS. 3 and 4, corresponding to FIGS. 1 and 2, respectively, the beverage container body 14 has a cylindrical profile with an interior body cavity 17 for holding a beverage "B" and an upwardly open, upper end portion 18 at which the beverage container lid 12 is removably attachable. The body cavity 17 is defined by a sidewall 17A and a bottom wall 17B closing a bottom end of the body cavity, and has an open upper end 17C. If desired, the beverage container 10 may be constructed with a beverage container body of any other desired shape. Further, the beverage container body 14 may have a single-walled or double-walled construction, or any other desired construction.

As best shown in FIGS. 3 and 4, the beverage container lid 12 has a lid body 20 with a lid upper body portion 22 and a lid lower body portion 24 extending about a vertically oriented central lid axis 26. The body cavity sidewall 17A extends fully and symmetrical about the lid axis 26. Other shapes of body cavity sidewalls may be used. The lid lower body portion 24 is sized and shaped to be inserted into the upper end portion 18 of the beverage container body 14. In the illustrated embodiment, and best seen in FIGS. 5-7, the lid lower body portion 24 of the beverage container lid 12 has exterior threads 30 by which the beverage container lid may be removably attached to the upper end portion 18 of the beverage container body 14, which has corresponding interior threads 32. Other forms of removably connecting the beverage container lid 12 to the beverage container body 14 may be used, such as a friction fit.

Typically, a seal (not shown) is provided between the lid lower body portion 24 and the upper end portion 18 of the beverage container 14 to provide a fluid-tight seal between them. If using a friction fit to removably connect the beverage container lid 12 to the beverage container body 14, rather than a threaded attachment, when the lid lower body portion 24 is inserted into the upper end portion 18 of the beverage container body, the seal also may serve to provide the friction needed to prevent unintended separation of the beverage container lid from the beverage container body during normal use.

As noted, the interior body cavity 17 of the beverage container body 14 serves as a primary vessel for holding a beverage. As shown in FIGS. 3 and 4, the beverage container lid 12 has attached thereto a refillable additive well or reservoir 34 that serves as a secondary vessel to hold an additive "A" intended to be selectively added to the swig or portion of the beverage "B" being drunk as it is being drunk, without adding additive directly to interior body cavity 17 of the beverage container body 14. The additive may be a powder additive or a liquid additive. The additive reservoir 34 has a generally cylindrical profile with an interior additive reservoir cavity 36 for holding the additive and an upwardly open, upper end portion 38 at which the additive reservoir is removably attached to the beverage container lid 12. The additive reservoir cavity 36 is defined by a sidewall 36A and a bottom wall 36B closing a bottom end of the additive reservoir cavity, and has an open upper end 36C. If desired, the additive reservoir 34 may be constructed with other sizes and shapes. As will be described below, the additive reservoir 34 holds the additive "A" and isolates it from the beverage "B" in the beverage container 10 until the user permits the additive to be released either for mixing with a portion of the beverage in the beverage container prior to the mixture being drunk, or for being directly drunk without being mixed with the beverage in the beverage container.

Figure 13:
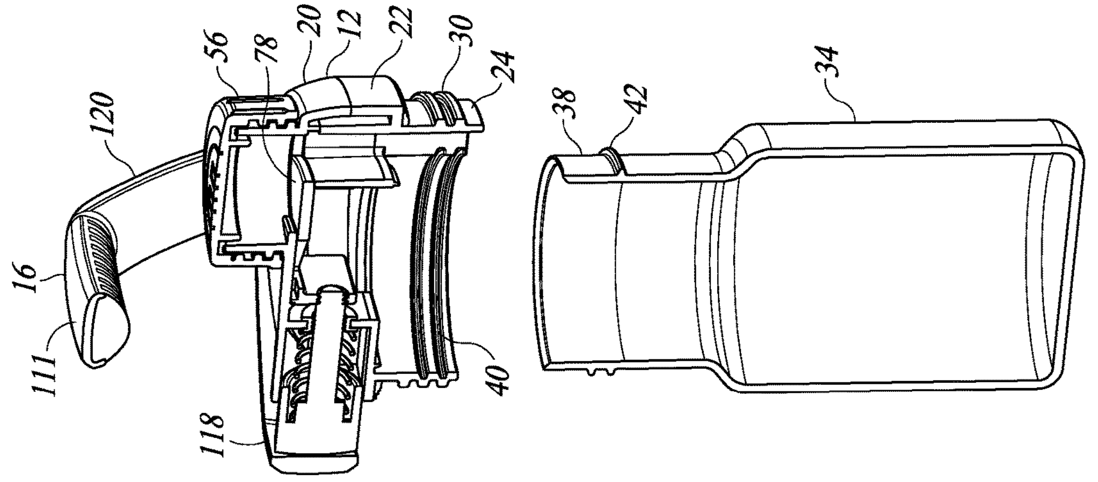
FIG. 13 is a top perspective, cross-sectional view of the disconnected beverage container lid and additive reservoir of FIG. 12.
Figure 12:
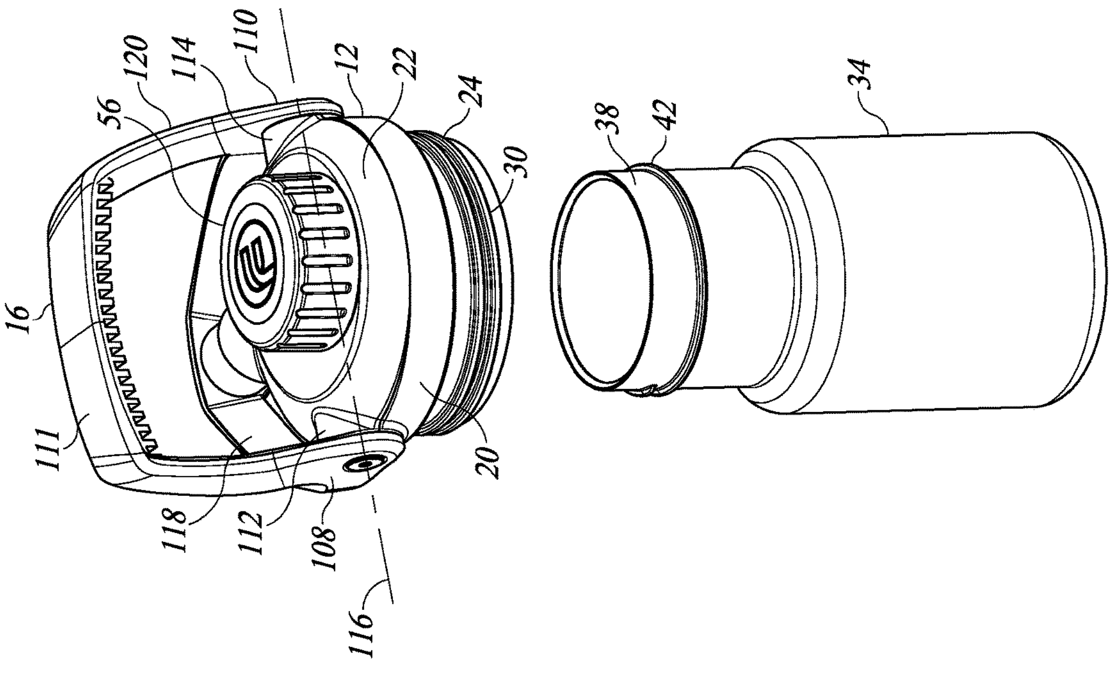
FIG. 12 is a top perspective view of the disconnected beverage container lid and additive reservoir, shown removed from the beverage container body of FIG. 1.

In the illustrated embodiment, the lid lower body portion 24 of the beverage container lid 12 has interior threads 40, located inward of the exterior threads 30. The upper end portion 38 of the additive reservoir 34 has corresponding exterior threads 42 by which the additive reservoir may be removably attached to the lid lower body portion 24. The additive reservoir 34 is shown attached to the lid lower body portion 24 in FIG. 8, prior to attachment of the lid lower body portion 24 of the beverage container lid 12 to the upper end portion 18 of the beverage container body 14, When additive reservoir 34 is attached to the lid lower body portion 24 and the lower body portion is attached to the beverage container body 14, the additive reservoir 34 extends downward from and beyond the lid lower body portion and into the interior body cavity 17 of the beverage container body 14 and may be immersed in the beverage within the interior body cavity; however, the sidewall 36A and bottom wall 36B of the additive reservoir cavity 36 isolate the additive therein from the beverage and prevent the additive from being released into the beverage. The additive reservoir 34 may be unscrewed from the lid lower body portion 24 for adding additive to the additive reservoir and for cleaning. The additive reservoir 34 is shown disconnected from the lid lower body portion 24 in FIGS. 12 and 13.

Figure 5:
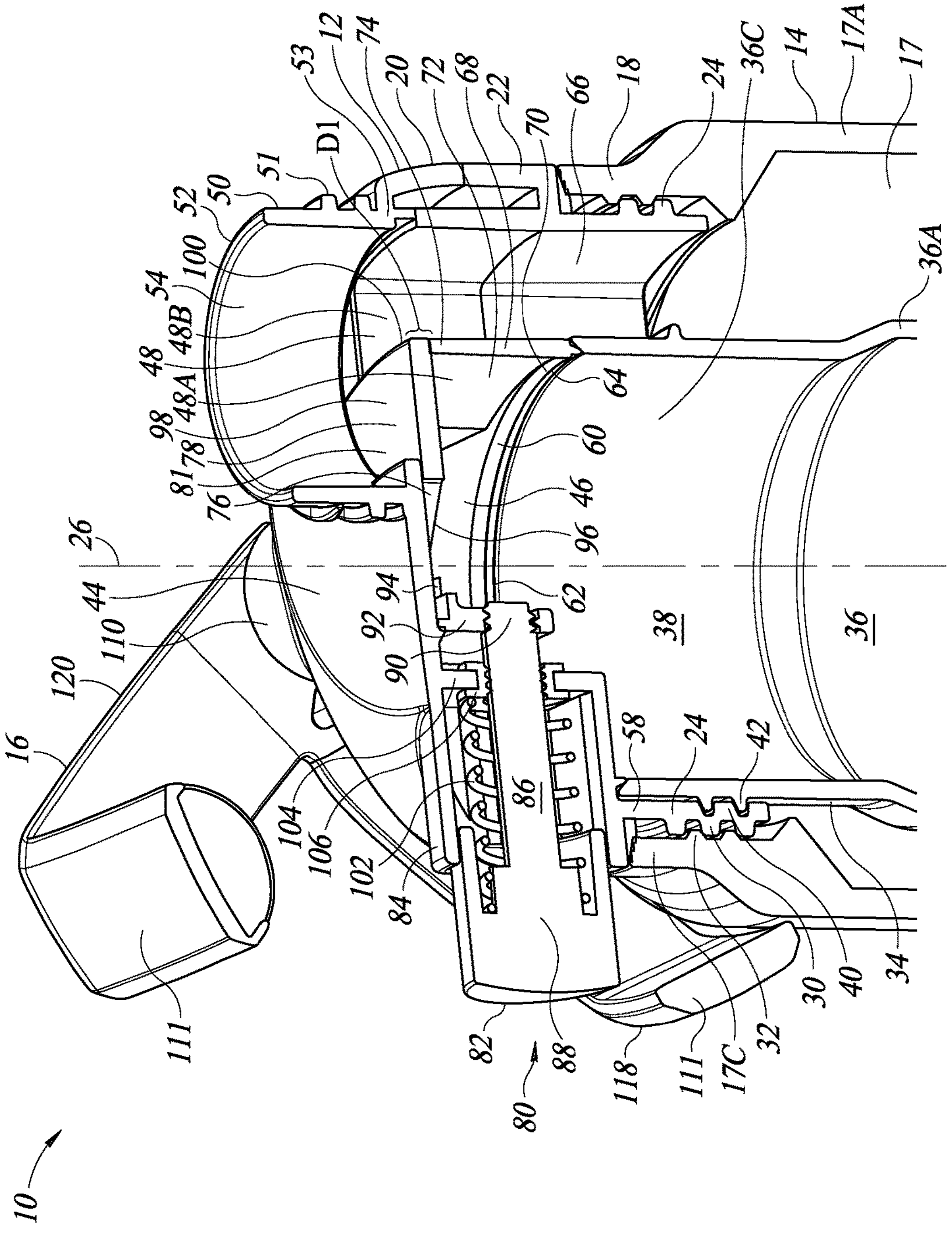
FIG. 5 is an enlarged, partial top perspective, cross-sectional view of the beverage container as shown in FIGS. 2 and 4 with the handle/lock assembly in the unlocked position and a slider gate positioned for drinking a beverage without being mixed with an additive.
Figure 6:
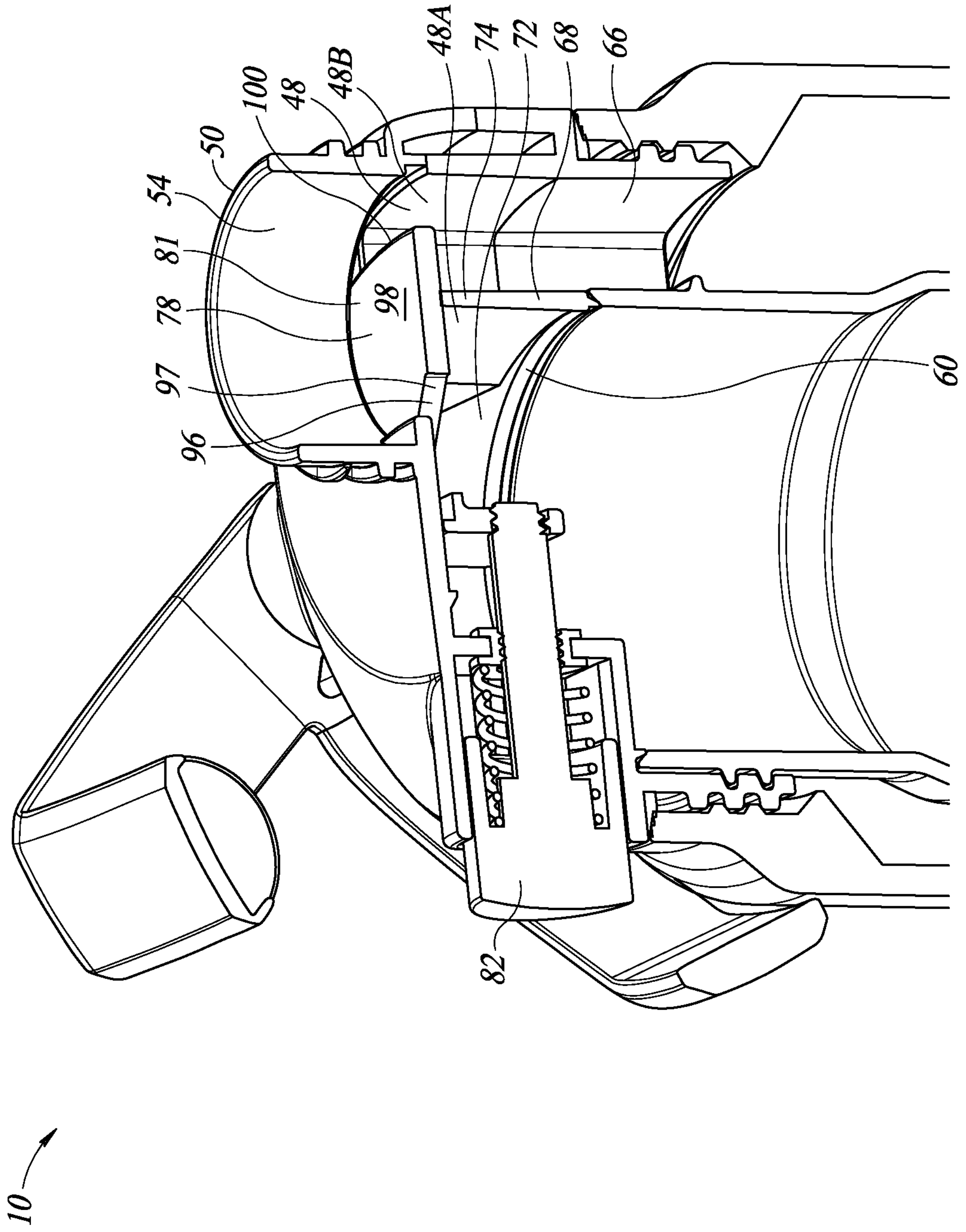
FIG. 6 is an enlarged, partial top perspective, cross-sectional view of the beverage container as shown in FIGS. 2 and 4 with the handle/lock assembly in the unlocked position and a button pressed inward to a position to move the slider gate to a position for drinking the beverage after being mixed with some additive.
Figure 7:
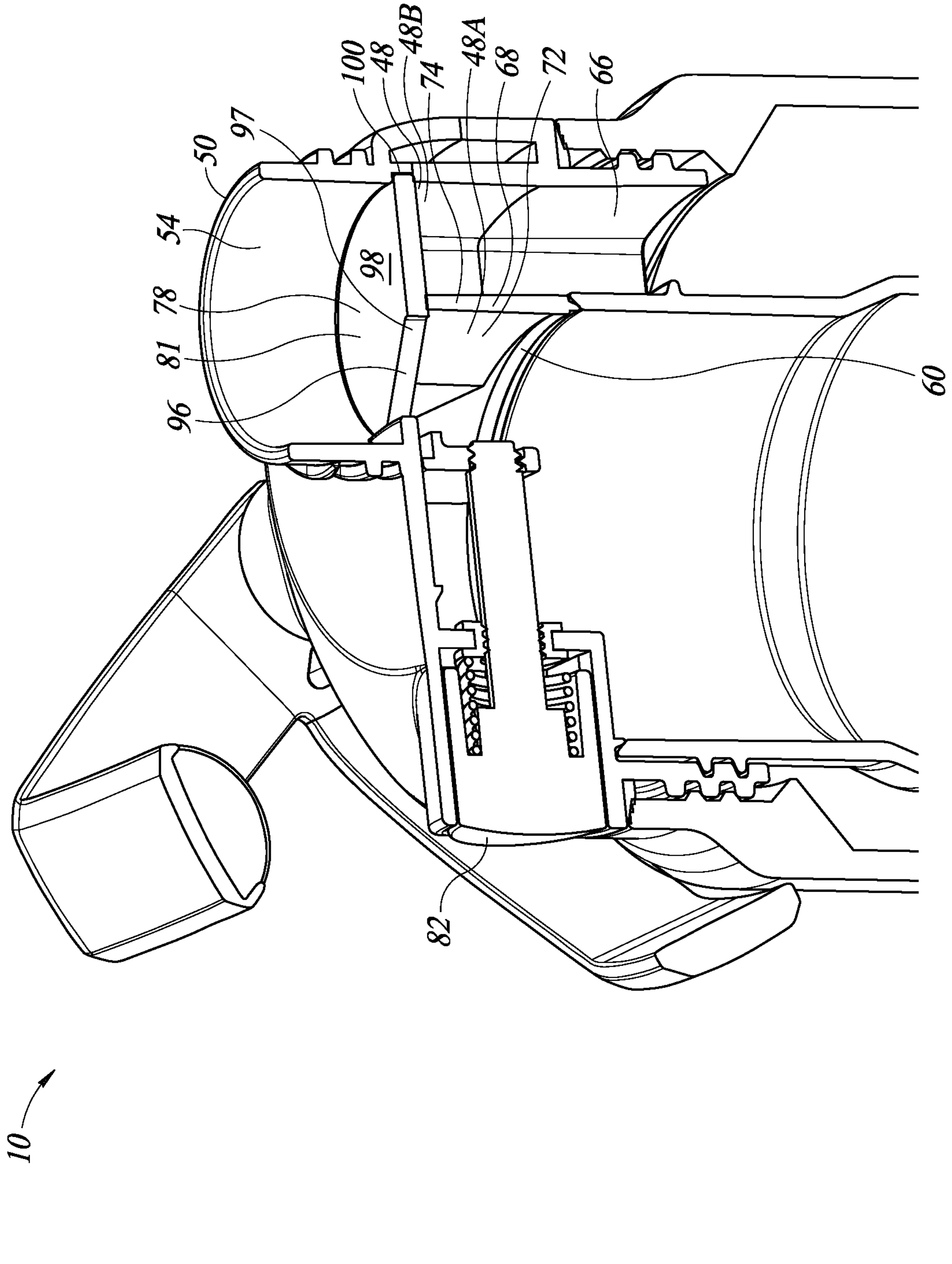
FIG. 7 is an enlarged, partial top perspective, cross-sectional view of the beverage container as shown in FIGS. 2 and 4 with the handle/lock assembly in the unlocked position and the button pressed farther inward than shown in FIG. 6 to move the slider gate to a position for drinking only additive without being mixed with the beverage.

As best seen in FIGS. 5-7, the lid upper body portion 22 includes an upper wall portion 44 and a lower wall portion 46 spaced below the upper wall portion. The upper wall portion 44 has an upper wall aperture 48 therein. An upwardly extending, cylindrical wall portion 50 extends about the upper wall aperture 48 and projects upwardly from the upper wall portion 44 and terminates at an open upward end 52. The upwardly extending wall portion 50 serves as a spout from which a user may drink the contents of the beverage container 10, i.e., beverage "B", additive "A" or the mixture of the two, as desired, and the volume within the upwardly extending wall portion serves as a mixing chamber 54 when additive in the additive reservoir 34 is released into the mixing chamber by a user of the beverage container, as will be described in more detail below. The upwardly extending wall portion 50 has exterior threads 51. As shown in FIGS. 1-4 and 8, a cap 56 having interior threads 57 corresponding to the threads 51 may be threaded onto the upwardly extending wall portion 50 to close its open upward end 52 to seal it against leakage of the contents within the beverage container 10. A seal is provided within the cap to be sealably engaged by the upwardly extending wall portion 50 (the spout) at its open end 52.

When the beverage container lid 12 is attached to the beverage container body 14, and the additive reservoir 34 is attached to the lid lower body portion 24, the lower wall portion 46 of the lid upper body portion 22 extends transversely to the lid axis 26 partially across an upper end 58 of the lid lower body portion 24 and covers a portion of the upper end 36C of the additive reservoir 34 to define an aperture 60 in the lower wall portion 46 through which additive in the additive reservoir can pass before entering the mixing chamber 54, as will be described in more detail below. A lower side 62 of the lower wall portion 46 has a sealing element 64 that is positioned to sealably engage with the upper end portion 38 of the additive reservoir 34 when the additive reservoir 34 is attached to the lid lower body portion 24.

As shown in FIGS. 3-8, the lid lower body portion 24 supports the additive reservoir 34 when attached thereto at a position laterally offset from the lid axis 26 to define a side channel 66 extending between the body cavity 17 and the mixing chamber 54. An interior dividing wall 68 projects upwardly from an inward end portion 70 of the lower wall portion 46 toward the upper wall portion 44, that serves as an inward side wall portion that in part defines the side channel 66 and as an outward side wall portion that in part defines an additive passageway 72 extending between the aperture 60 in the lower wall portion 46 and the mixing chamber 54, when the beverage container lid 12 is attached to the beverage container body 14, and the additive reservoir 34 is attached to the lid lower body portion 24. An upper end 74 of the interior dividing wall 68 terminates at a distance "D1" below a lower side of the upper wall portion 44 to define a transversely extending space 76 immediately below the outer wall aperture 48, sized to slidably receive a valve in the form of a planar slider gate 78 of a manually operated control valve assembly 80, described in greater detail below.

The interior dividing wall 68 is positioned below the upper wall aperture 48 and essentially dissects the upper wall aperture, dividing the upper wall aperture into an additive aperture portion 48A and a beverage aperture portion 48B. The additive aperture portion 48A communicates with the additive passageway 72 and the additive reservoir 34, and the beverage aperture portion 48B communicates with the side channel 66 and the body cavity 17.

When the slider gate 78 of the control valve assembly 80 is positioned such that the additive aperture portion 48A is closed and the beverage aperture portion 48B is open for drinking only additive-free beverage from the body cavity 17 of the beverage container body 14 (see FIGS. 5 and 8), and the beverage container is tilted for a user to drink from the upwardly extending wall portion 50 (the spout), the additive cannot enter the mixing chamber 54 and the interior dividing wall 68 prevents additive in the additive passageway 72 received from the additive reservoir 34 from entering the side channel 66, and hence blocks the additive from entering the body cavity 17, thus keeping the beverage in the body cavity additive free.

When the slider gate 78 of the control valve assembly 80 is positioned such that the additive aperture portion 48A is at least partially open and the beverage aperture portion 48B is at least partially open (see FIG. 6), and the beverage container is tilted for a user to drink from the upwardly extending wall portion 50 (the spout), the interior dividing wall 68 prevents additive in the additive passageway 72 received from the additive reservoir 34 from entering the side channel 66 and beverage in the side channel 66 received from the body cavity 17 from entering the additive passageway, and forces the additive and beverage to enter into the mixing chamber 54 to mix and then be drunk from the spout without the additive entering the side channel 66 and the body cavity 17, thus again keeping the beverage in the body cavity additive free. The range of movement of the slider gate 78 is sufficient to allow a user to adjust the amount the additive aperture portion 48A and the beverage aperture portion 48B are open to adjust the relative amounts of additive and beverage that enter into the mixing chamber 54 for mixing prior to being drunk.

When the slider gate 78 of the control valve assembly 80 is positioned such that the additive aperture portion 48A is open for drinking only additive in the additive passageway 72 received from the additive reservoir 34 (typically a liquid additive) and the beverage aperture portion 48B is closed (see FIG. 7), and the beverage container is tilted for a user to drink from the upwardly extending wall portion 50 (the spout), the beverage cannot enter the mixing chamber 54 and the interior dividing wall 68 prevents beverage received in the side channel 66 received from the body cavity 17 from entering the additive passageway 72 and mixing with the additive therein.

Figure 8:
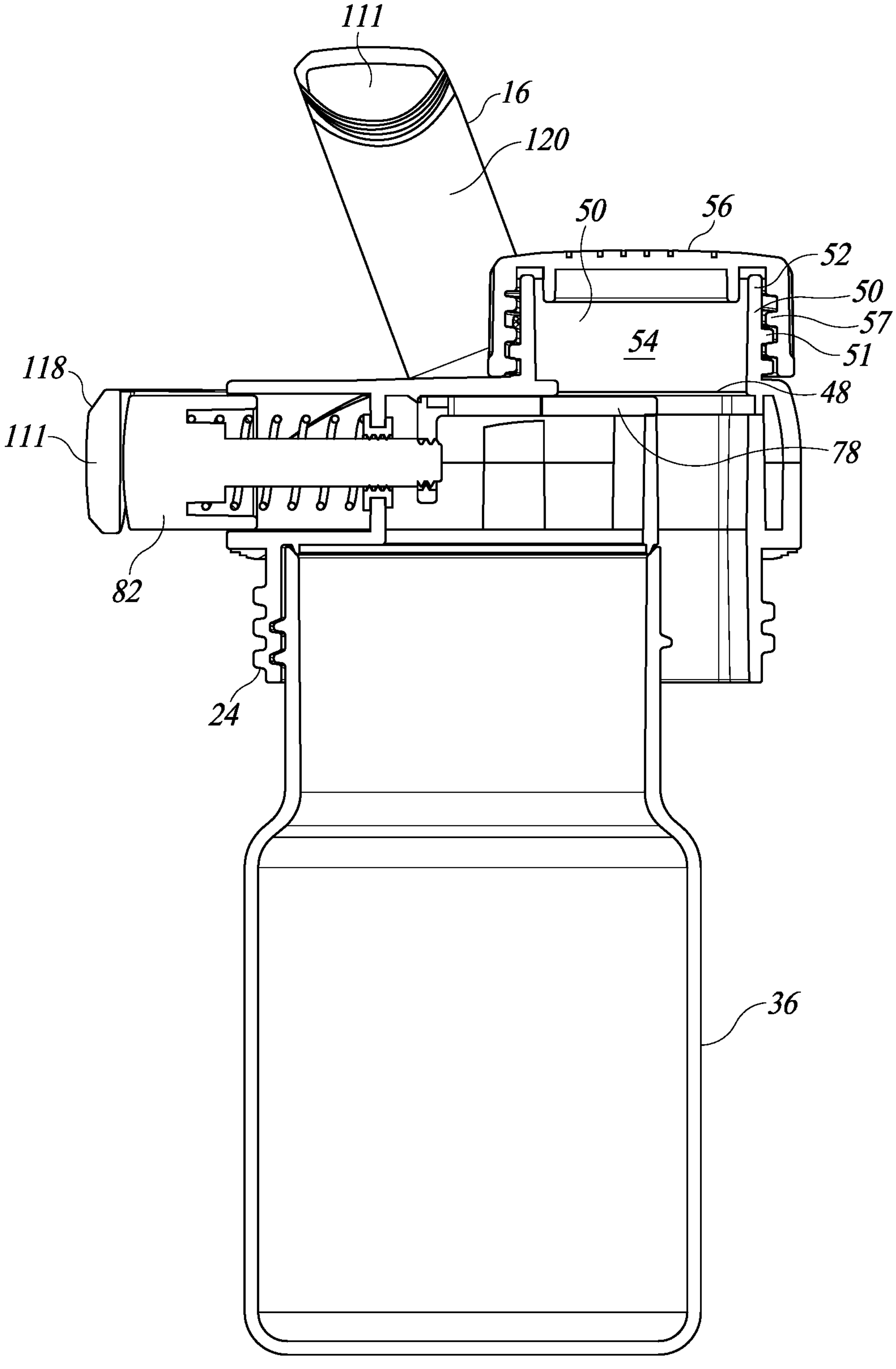
FIG. 8 is an enlarged, side elevational, cross-sectional view of the beverage container as shown in FIGS. 1 and 3 with the handle/lock assembly in a locked position, but with the beverage container body removed.
Figure 9:
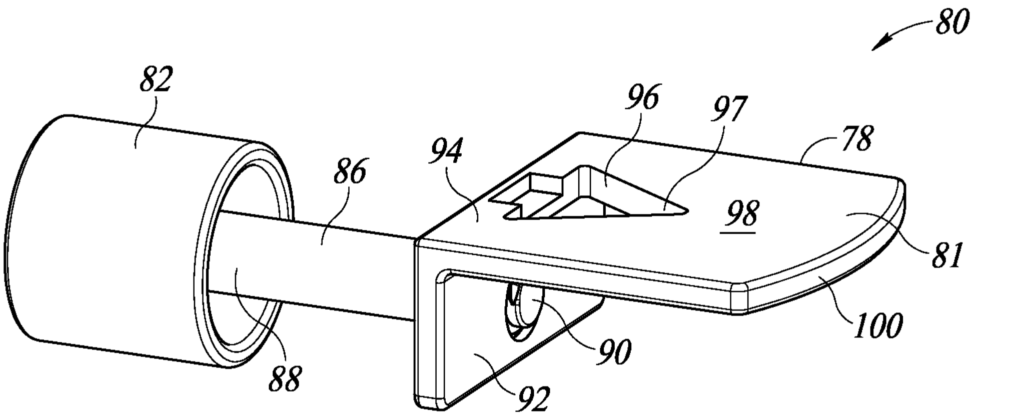
FIG. 9 is an enlarged perspective view of the slider gate shown removed from the beverage container.
Figure 10:
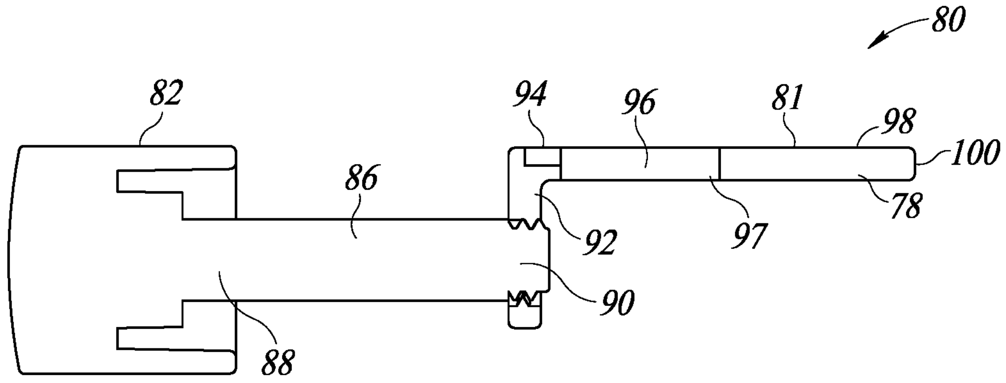
FIG. 10 is a side elevational, cross-sectional view of the slider gate of FIG. 10.
Figure 11:
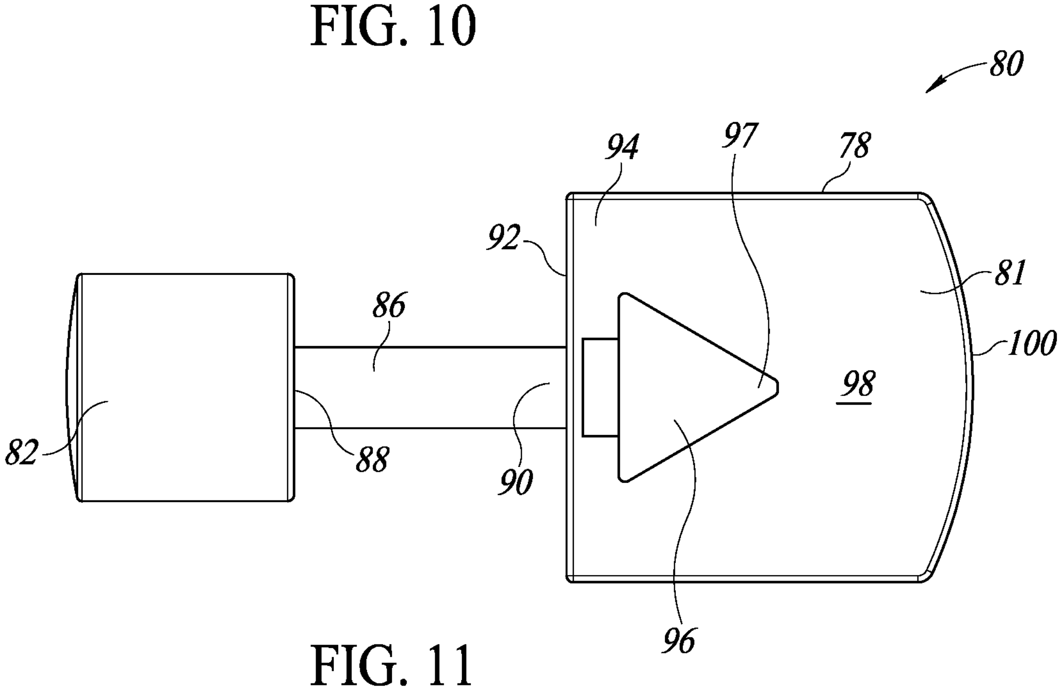
FIG. 11 is a top view of the slider gate of FIG. 10.
Figure 16:
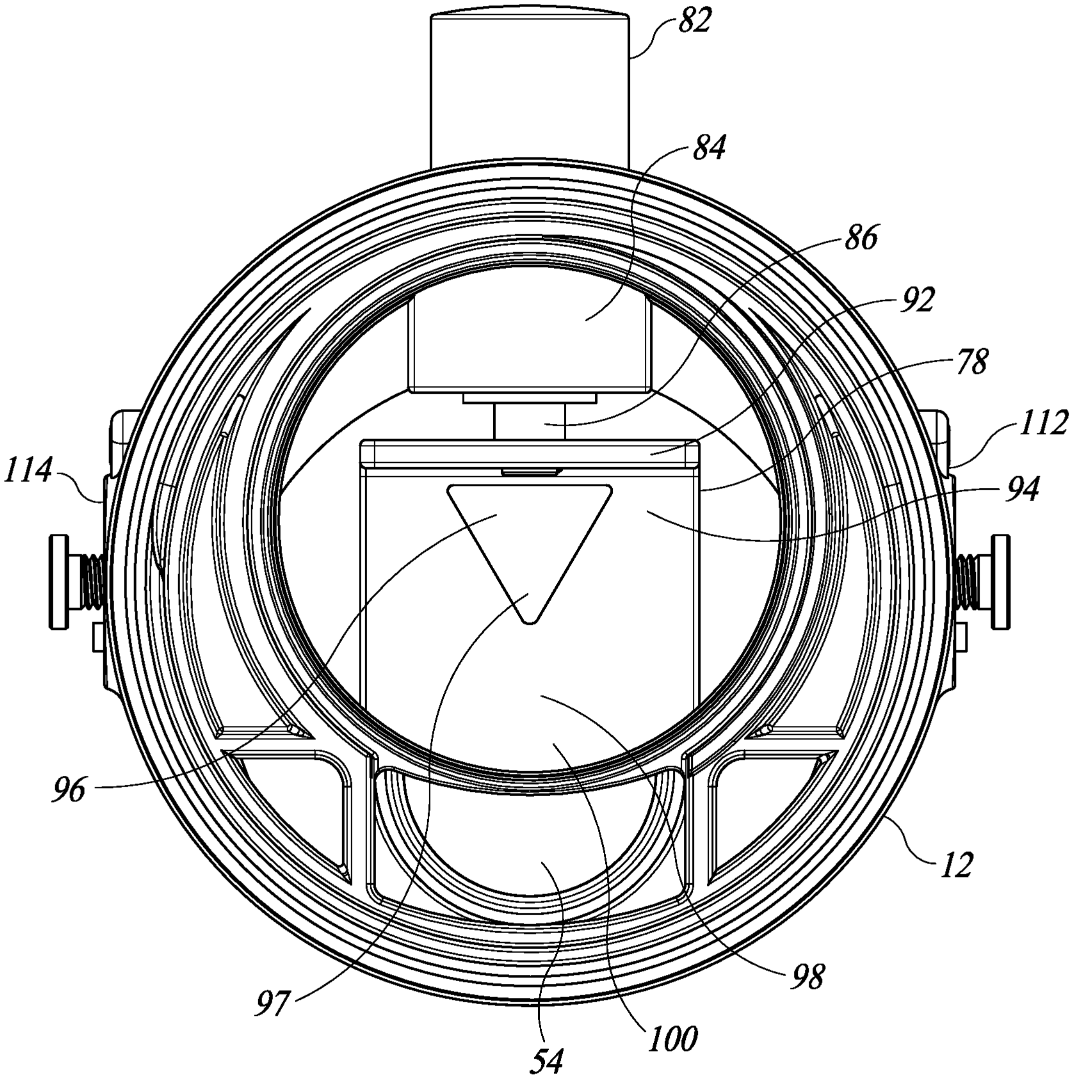
FIG. 16 is a bottom view of the beverage container lid with the handle/lock assembly and cap removed.

The manually operated control valve assembly 80 is best illustrated in FIGS. 5-8 showing example operating positions within the beverage container lid 12, in FIGS. 9-11 showing the control valve assembly removed from the beverage container lid, and in FIG. 16 showing a bottom view of the beverage container lid 12 with the handle/lock assembly 16 and cap 56 removed. As described above, the control valve assembly 80 controls the flow of additive through the additive aperture portion 48A into the mixing chamber 54 and the flow of beverage through the beverage aperture portion 48B into the mixing chamber, when the beverage container 10 is tilted for drinking in response to the position selected by the user of the variably positionable slider gate 78, either before or during drinking from the beverage container 10. As described above, the control valve assembly 80 provides three modes of operation resulting from the position to which the user moves the slider gate 78. One mode as shown in FIG. 5 allows the beverage in the beverage container 10 passing through the side channel 66 to be drunk without being mixed with any additive from the additive reservoir 34.

Another mode shown in FIG. 6 dispenses the additive in a user selected amount from the additive reservoir 34 for mixing in the mixing chamber 54 with a portion of the beverage from the beverage container 10 prior to the mixture passing out of the open end 52 of the upwardly extending wall portion 50 (the spout) and into the mouth of the user for drinking the mixture. In this mode, the user can select a desired position for the slider gate 78 and thereby meter the flow of additive and beverage entering the mixing chamber 54, with each selected position of the slider gate producing a different ratio of the permitted flow of additive and beverage to the mixing chamber, to allow mixing of additive and beverage in the mixing chamber in a range of different ratios. In the illustrated embodiment, the slider gate 78 is movable sequentially between a plurality of selectable positions in first and second directions. When moved in the first direction the ratio of the permitted flow of additive and beverage to the mixing chamber progressively increases, and when moved in the opposite second direction the ratio of the permitted flow of additive and beverage to the mixing chamber progressively decreases.

Yet another mode shown in FIG. 7 allows drinking of the additive (typically a liquid additive) without it being mixed with any beverage from the body cavity 17 of the beverage container 10.

An upper side of the slider gate 78 serves as the sealing surface by its engagement with a lower end perimeter portion 53 of the upwardly extending wall portion 50, and may be covered with a material that increases its sealing capability such as by overmolding, such as discussed below.

The slider gate 78 of the control valve assembly 80 is slidably retained by the beverage container lid 12 to slide within the transversely extending space 76 for selective transverse linear movement through that space in response to the user pressing inward on a spring-loaded button 82 slidably retained within a tubular housing portion 84 of the upper body portion 22 and projecting out of housing portion. A button shaft 86 has an outward shaft end portion 88 attached to the button 82 and an inward shaft end portion 90 threadably attached to a downwardly extending arm 92 attached to an outward end portion 94 of the slider gate 78. A user pressing on the button 82 transmits an inward moving force on the button shaft 86 that is applied to the arm 92 and to the slider gate 78 to move the slider gate inward to variable positions of the slider gate to control the operation of the beverage container lid 12. The slider gate 78 has an additive control aperture 96 extending therethrough, and inward thereof, a solid inward end portion 98 terminating in an inward end 100. The additive control aperture 96 is located in the slider gate 78 so as to be able in certain positions of the slider gate to control the flow/movement of additive through the additive aperture portion 48A when the beverage container 10 is tilted for drinking by being selectively positioned by the user to be completely out of alignment with the additive aperture portion or at least partially in alignment with the additive aperture portion. The solid inward end portion 98 of the slider gate 78 is located and sized so as to be able in certain positions of the slider gate to control the flow/movement of the beverage through the beverage aperture portion 48B when the beverage container 10 is tilted for drinking by being selectively positioned by the user to partially or fully block the flow/movement of beverage through the beverage aperture portion. In user variable positions, as will be described below, the slider gate 78 controls the flow/movement into the mixing chamber 54 of both the additive in the additive passageway 72 and the beverage in the side channel 66.

In the position of the slider gate 78 shown in FIGS. 5 and 8, the additive control aperture 96 is completely out of alignment with the additive aperture portion 48A and the solid inward end portion 98 of the slider gate 78 is sized to fully overlap the additive aperture portion to block all flow/movement of the additive in the additive passageway 72 received from the additive reservoir 34 through the additive aperture portion and into the mixing chamber 54 when the beverage container 10 is tilted for drinking. However, in this position the inward end 100 of the slider gate 78 is positioned above the upper end 74 of the interior wall 68 and the solid inward end portion 98 of the slider gate 78 does not fully (or at all in the illustrated embodiment) overlap with the beverage aperture portion 48B, thus allowing the beverage in the side channel 66 received from the body cavity 17 to flow/move into the mixing chamber 54 when the beverage container 10 is tilted for drinking. Thus, the user is allowed to drink the beverage without adding any additive.

As the user presses inward on the button 82 to move the slider gate 78 from the position shown in FIGS. 5 and 8, the slider gate 78 will move into a position such as shown in FIG. 6, whereat the additive control aperture 96 is at least partially in alignment with the additive aperture portion 48A to allow some flow/movement of the additive in the additive passageway 72 received from the additive reservoir 34 through the additive aperture portion and into the mixing chamber 54. In this position the inward end 100 of the slider gate 78 will extend inward past the upper end 74 of the interior wall 68 and the solid inward end portion 98 of the slider gate 78 will at least partially overlap with the beverage aperture portion 48B, thus reducing the amount of beverage in the side channel 66 received from the body cavity 17 allowed to flow/move into the mixing chamber 54.

If the user presses inward on the button 82 with enough force to move the slider gate 78 farther inward, the slider gate 78 will move into a position whereat the additive control aperture 96 is more aligned with the additive aperture portion 48A to allow an increased flow/movement of the additive in the additive passageway 72 received from the additive reservoir 34 through the additive aperture portion and into the mixing chamber 54, and whereat the inward end 100 of the slider gate 78 will extend inward farther past the upper end 74 of the interior wall 68 and the solid inward end portion 98 of the slider gate 78 will overlap more with the beverage aperture portion 48B to reduce the amount of beverage in the side channel 66 received from the body cavity 17 allowed to flow/move into the mixing chamber 54. As the user presses the button 82 farther inward, the rate of flow/movement of additive into mixing chamber 54 will increase and the rate of flow/movement of beverage into the mixing chamber will decrease. Thus, the user by selective how far to move the button 82 inward can select a desired ratio of additive and beverage to enter the mixing chamber 54 to suit the taste of the user, and can do so during the course of a swig or select a different ratio from swig to swig.

In other words, the user may move the slider gate 78 within a range of positions to allow essentially an infinitely variable range of ratios of mixed additive and beverage, and the user can select to change the proportions of additive and beverage being mixed in the mixing chamber 54 to suit the taste of the user during a swig or from swig to swig, with the additive and the beverage being mixed prior to exiting out the open end 52 of the upwardly extending wall portion 50 (the spout) and entering the mouth of the user.

If the user moves the button 82 sufficiently inward to the position of the slider gate 78 shown in FIG. 7, the additive control aperture 96 will be in maximum alignment with the additive aperture portion 48A to allow the largest flow/movement of the additive in the additive passageway 72 received from the additive reservoir 34 through the additive aperture portion and into the mixing chamber 54, and the solid inward end portion 98 of the slider gate 78 will fully overlap the beverage aperture portion 48B to block all flow/movement of the beverage in the side channel 66 received from the body cavity 17 into the mixing chamber 54. In other words, in the position shown in FIG. 7, the user is able to drink the additive in the additive passageway 72 received from the additive reservoir 34 (typically a liquid additive) without having it mixed with any beverage from the side channel 66 received from the body cavity 17.

Thus, in user variable positions of the slider gate 78, the slider gate allows the additive in the additive passageway 72 received from the additive reservoir 34 to flow through the additive control aperture 96 and the additive aperture portion 48A and into the mixing chamber 54, with differing flow rates depending on the position of the slider gate, in particular, depending on the amount of alignment of the additive control aperture with the additive aperture portion 48A, and allows the beverage in the side channel 66 received from the body cavity 17 to flow though the beverage aperture portion 48B and into the mixing chamber, with differing flow rates depending on the position of the solid inward end portion 98 of the slider gate 78.

When the user has ingested the amount desired during a swig and before lowering the beverage container 10 to an upright position, the slider gate 78 can be returned to the position shown in FIGS. 5 and 8 where the slider gate fully closes the additive aperture portion 48A and the beverage aperture portion 48B is fully opened. Then, after the mixture remaining in the mixing chamber 54 is fully drunk, when the user returns the beverage container 10 to the upright position, any additive remaining in the additive passageway 72 falls back into the additive reservoir 34, and since all the mixture in the mixing chamber has been drunk, none is left in the mixing chamber to drain back into the body cavity 17. It is recognized that after the mixture in the mixing chamber 54 is fully drunk, beverage in the side channel 66 will flow back into the body cavity 17 when the beverage container 10 is returned to the upright position, but that beverage will contain little or no additive.

The button shaft 86 extends through a coil spring 102 arranged to provide a force the user must overcome to move the button 82 inward to move the slide gate 78 inward as described above. The spring 102 applies a sufficient outwardly directed return force to return the button 82 and the slider gate 78 to their positions shown in FIGS. 5 and 8 when the user sufficiently removes the user inward force being applied to the button. The button shaft 86 extends through an aperture in an interior wall 104 serving as a side wall that in part defines the additive passageway 72. A seal 106, through which the button shaft 86 extends and sealably engages is mounted in the aperture to prevent leakage of additive in the additive passageway 72 into the housing portion 84 of the upper body portion 22 in which the button 82 is slidable retained.

In the illustrated embodiment, the additive control aperture 96 has a triangular shape, with an apex area 97 oriented toward the solid inward end portion 98 of the slider gate 78, and terminating inward of the inward end 100 of the solid inward end portion 98. Thus, when the beverage container 10 is tilted for drinking and the slider gate 78 is initially moved inward by the user to move the additive control aperture 96 into alignment with the additive aperture portion 48A, the flow/movement of the additive in the additive passageway 72 through the additive control aperture and into the mixing chamber 54 is initially through the apex area 97 of the triangular additive control aperture. This tends to initially inject a stream-like flow of additive into the central portion of the mixing chamber 54 and hence into the center of the flow of beverage passing into the mixing chamber from the side channel 66. This tends to initially concentrate the additive in the center of the flow of beverage within the mixing chamber, providing for a desirable mixing and beverage taste when drunk by the user from the upwardly extending wall portion 50 (the spout).

As the slider gate 78 is moved further inward by the user, if desired, the volume of the additive flow gradually increases, and hence the amount of additive being added to the flow of beverage into the mixing chamber 54 gradually increases. However, as this occurs, the solid inward end portion 98 of the slider gate 78 will move inward and increasingly overlap with the beverage aperture portion 48B to reduce the flow/movement of the beverage in the side channel 66 into the mixing chamber 54. If the slider gate 78 is move fully inward by the user, the additive control aperture 96 reach its maximum alignment with the additive aperture portion 48A to allow the largest flow/movement of the additive into the additive passageway 72, and the solid inward end portion 98 of the slider gate 78 will fully overlap the beverage aperture portion 48B to block all flow/movement of the beverage in the side channel 66 received from the body cavity 17 into the mixing chamber 54.

By selection of the shape and size of the additive control aperture 96 used for the slider gate 78, the rate of change and position of the flow/movement of additive from the additive passageway 72 into the mixing chamber 54 can be change, which impacts the type of mixing that occurs in the mixing chamber. It is to be understood that other shapes of additive control apertures other than triangular may be used.

Figure 14C:
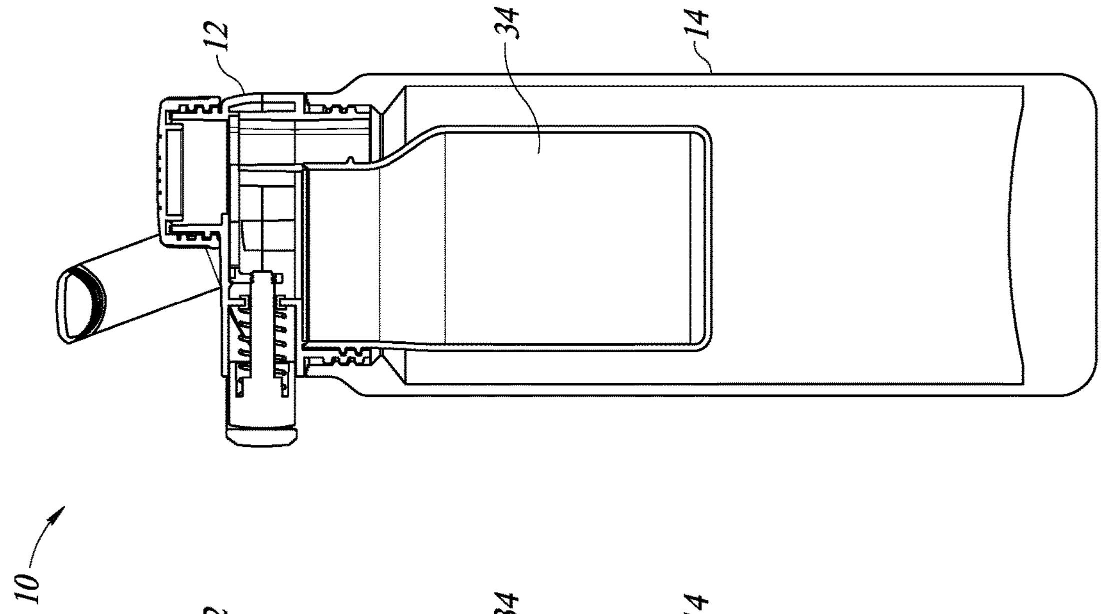
FIG. 14C is a side elevational, cross-sectional view of the beverage container of FIG. 1 using a third size and shaped additive reservoir.
Figure 14B:
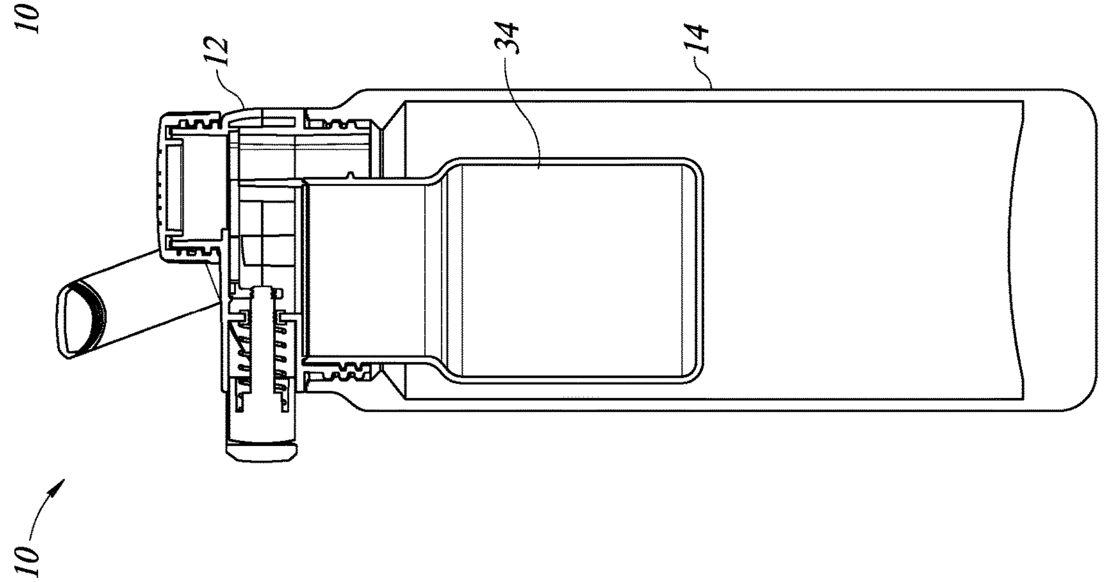
FIG. 14B is a side elevational, cross-sectional view of the beverage container of FIG. 1 using a second size and shaped additive reservoir.
Figure 14A:
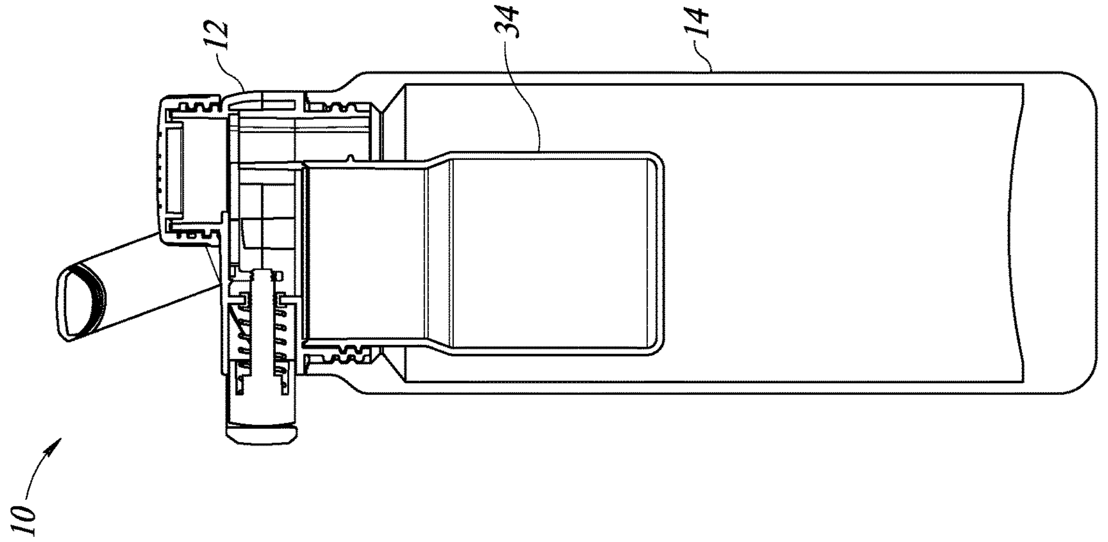
FIG. 14A is a side elevational, cross-sectional view of the beverage container of FIG. 1 using a first size and shaped additive reservoir.

The refillable additive reservoir 34 may have several shapes and sizes, as shown in FIGS. 14A, 14B and 14C, depending on the volume of the additive the user desires to carry within the beverage container 10, and also on the shape and size of the beverage container body 14 to which the beverage container lid 12 is to be attached. While the beverage container lid 12 may be sold in combination with a beverage container body 14, it may also be sold as a separate product for use with existing beverage container bodies of others. When sold for use with existing beverage container bodies, the additive reservoir used will need to be sized and shaped to fit within the existing beverage container bodies.

Figure 15C:
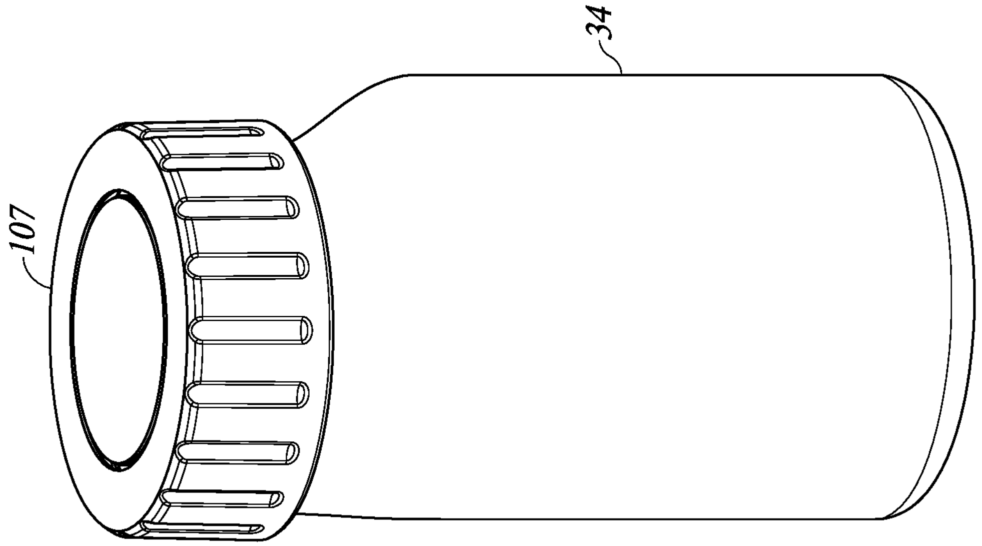
FIG. 15C is a side perspective view of the second size and shaped additive reservoir shown in FIG. 14C, shown removed from the beverage container and with a reservoir travel lid attached.
Figure 15B:
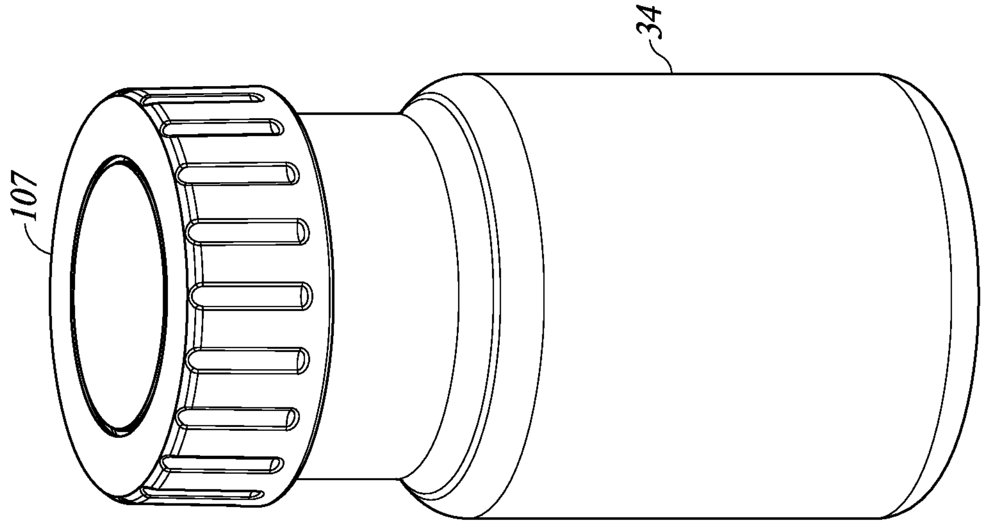
FIG. 15B is a side perspective view of the second size and shaped additive reservoir shown in FIG. 14B, shown removed from the beverage container and with a reservoir travel lid attached.
Figure 15A:
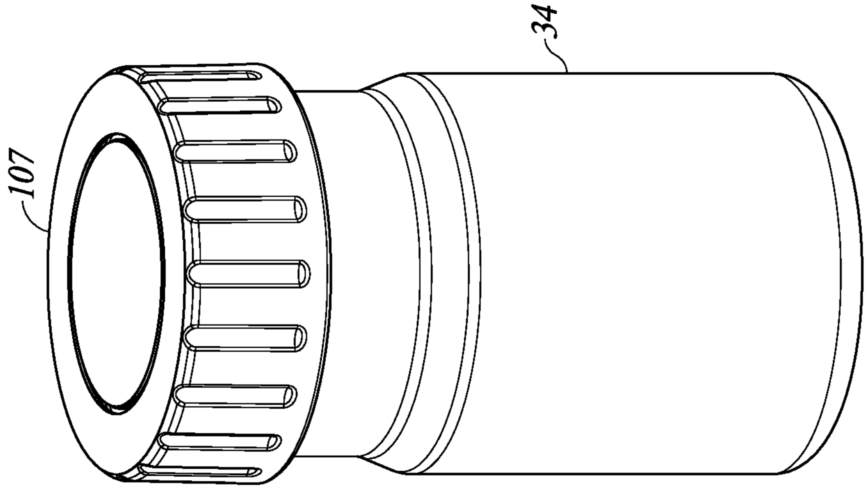
FIG. 15A is a side perspective view of the first size and shaped additive reservoir shown in FIG. 14A, shown removed from the beverage container and with a reservoir travel lid attached.

As shown in FIGS. 15A, 15B and 15C, a reservoir travel lid 107 may be used with the additive reservoir 34 to close its open upper end 36C and securely contain the additive within the additive reservoir prior to it being attached to the beverage container lid 12. The reservoir travel lid 107 also allows the user to carry one or more additional additive reservoirs when traveling, with the same or different additives therein, so as to increase the volume and style of mixed beverages possible with the beverage container 10. When carrying additional additive reservoirs, the currently installed additive reservoir 34 may be easily changed out and replaced with a different additive reservoir and its reservoir travel lid 107 used as a closure for the changed out additive reservoir.

In addition to FIG. 1, the beverage container lid 12 is shown with the handle/lock assembly 16 in the locked position in FIGS. 3, 8, 12, 13 and 14A-14C. In addition to FIG. 2, the beverage container lid 12 is shown with the handle/lock assembly 16 in the unlocked position in FIGS. 4-7. The handle/lock assembly 16 has a left side mounting portion 108 and a right side mounting portion 110, with the left side mounting portion pivotally attached to a left side boss 112 on the left side of the lid upper body portion 22 and with the right side mounting portion pivotally attached to a right side boss 114 on the right side of the lid upper body portion, for selective rotation of the handle/lock assembly about a common transverse axis of rotation 116 by a user relative to the lid upper body portion between the locked and unlocked positions. The left and right side mounting portions 108 and 110 are shown in FIG. 16 pivotally attached to the left and right bosses 112 and 114 using screws. Alternatively, the pivotal attach may be accomplished using pins or other means.

The handle/lock assembly 16 further includes a lock member portion 118 and a handle member portion 120, each having a left inward end portion rigidly attached to the left side mounting portion 108 and a right inward end portion rigidly attached to the right side mounting portion 110, and each having a left outward end portion and a right outward end portion rigidly attached to each other by a bridge portion 111, such that the lock member and the handle member rotate together. The lock member portion 118 and the handle member portion 120 each have an outwardly projecting/arching shape between their left and right inward end portions such that when the handle/lock assembly 16 is rotated about the axis of rotation 116 by a user between the locked and unlocked positions, the resulting rotational movements of the lock member and handle member portions are not blocked by engagement with the lid upper body portion 22, the cap 56 or the button 82.

Figure 18:
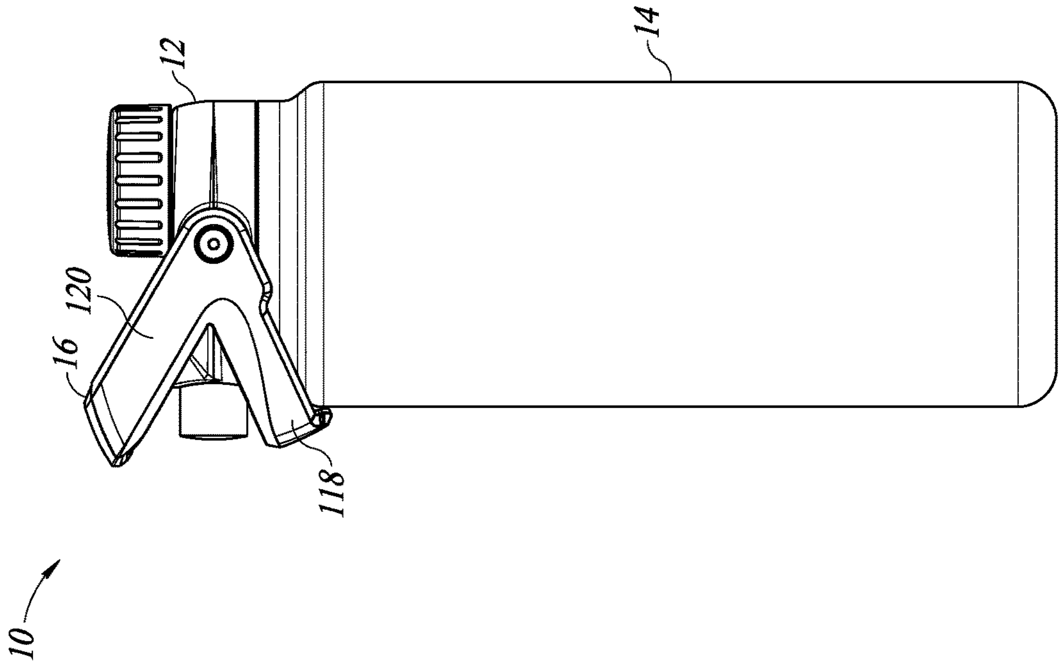
FIG. 18 is a side elevational view of the first alternative beverage container of FIG. 17 shown with the handle/lock assembly in the unlocked position.
Figure 17:
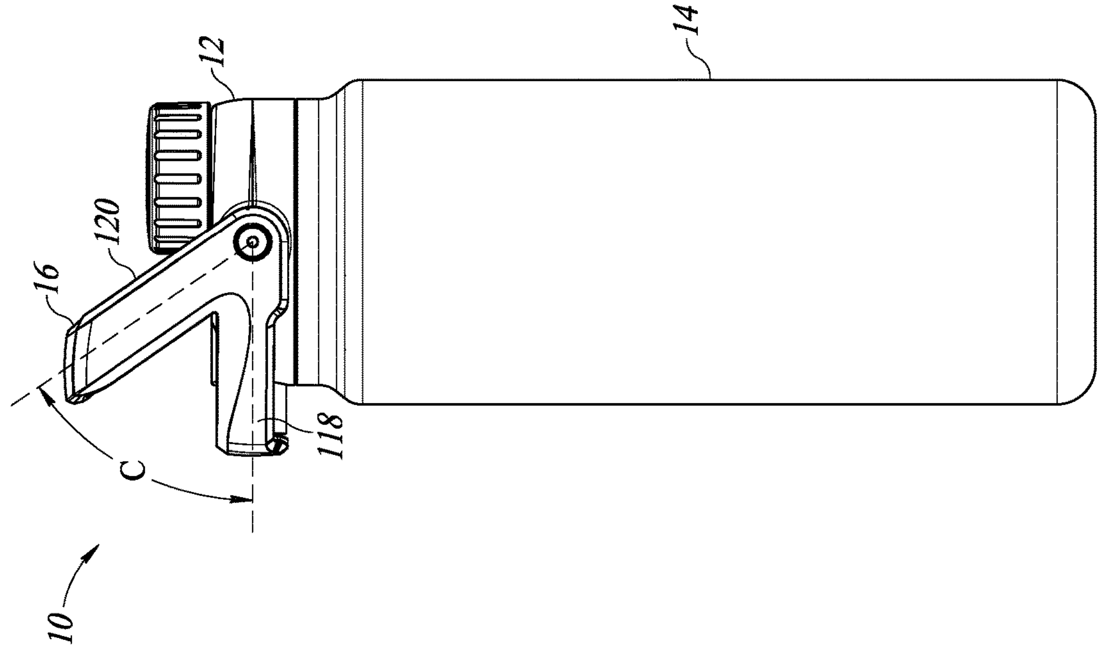
FIG. 17 is a side elevational view of a first alternative beverage container with the handle/lock assembly in the locked position and using an alternative angularly offset "C".
Figure 19:
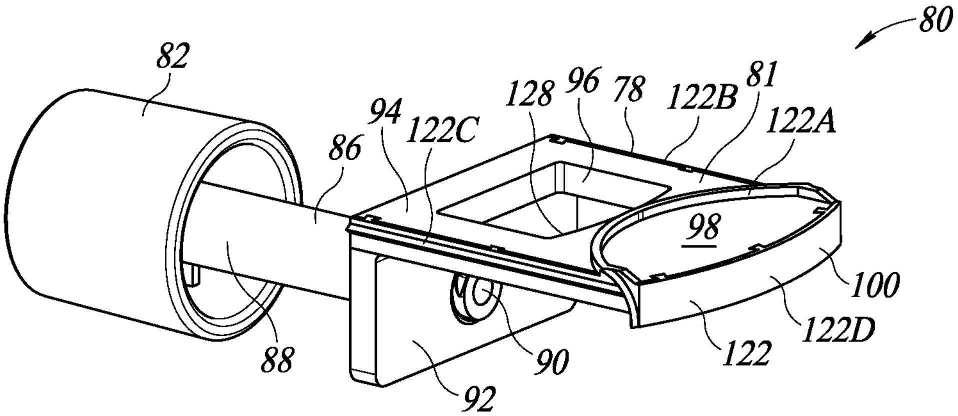
FIG. 19 is an enlarged perspective view of an alternative slider gate shown removed from a second alternative embodiment of the beverage container, corresponding to FIG. 9 of the first described embodiment.
Figure 20:
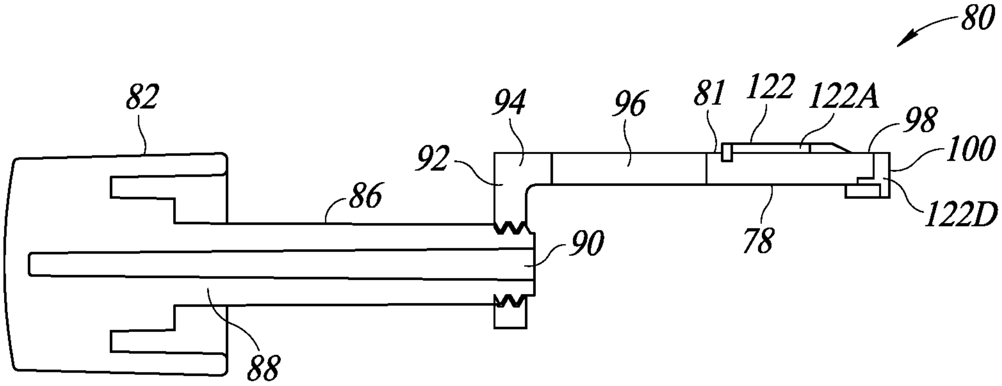
FIG. 20 is a side elevational, cross-sectional view of the alternative slider gate of FIG. 19, corresponding to FIG. 10 of the first described embodiment.
Figure 21:
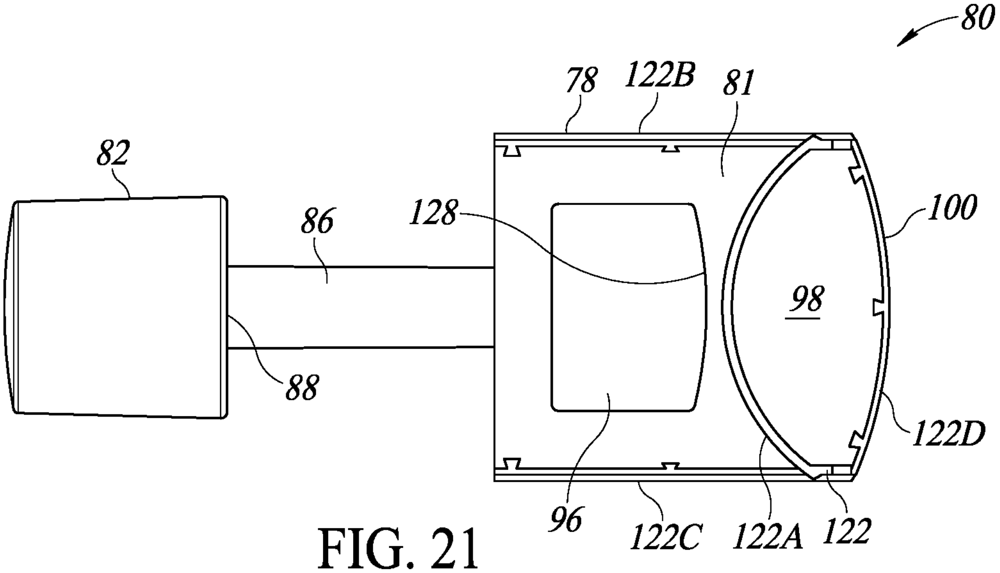
FIG. 21 is a top view of the alternative slider gate of FIG. 19, corresponding to FIG. 11 of the first described embodiment.

As perhaps best seen in FIGS. 1 and 2, the lock member portion 118 and the handle member portion 120 are separated by an angularly offset "C" from each other of about 70 degrees, with the handle member portion positioned above the lock member portion, such that there is a distance separation "D2" between the bridge portions of the lock member and handle member portions to provide a user with adequate access to operate the button 82 when the handle/lock assembly 16 is rotated by a user into the unlocked position, as illustrated in FIG. 2. A first alternative beverage container 10 is shown in FIGS. 17 and 18 with an alternative angularly offset "C" of about 56 degrees.

When the handle/lock assembly 16 is rotated by the user into the locked position, as illustrated in FIGS. 1, 3, 8, 12, 13 and 14A-14C, the bridge portion 111 of the lock member portion 118 is aligned with and overlaps the button 82 to prevent a user from having convenient access to operate the button 82 and to shield the button from unintended actuation by the user or by the button coming into contact with objects such as when the beverage container 10 is being carried in a bag or falls onto its side. Detents are provided to resist unintentional rotation of the handle/lock assembly 16 out of its locked and unlocked positions, and a slot is used to limit the rotational travel of the handle/lock assembly. It is to be understood that as used in this application, the handle/lock assembly 16 is referred to as being in the "locked" position because the button 82 is shielded against intentional or unintentional actuation by the bridge portion 111 of the lock member portion 118, thus, essentially locking the button against inward movement, even though the button itself remains inwardly movable. It is contemplated that other configurations may be utilized where, when the handle/lock assembly 16 is in the locked position, the button 82 would not be inwardly movable. Of course, the basic design of the beverage container lid 12 could be utilized to provide the three modes of operation described above without use of the handle/lock assembly 16, or with or without any other style button lock.

When the handle/lock assembly 16 is in the locked position, the bridge portion 11 of the handle member portion 120 is sufficiently spaced away from the lid upper body portion 22, the cap 56 or the button 82 to allow sufficient unobstructed space below the bridge portion for the user to conveniently grasp the bridge portion of the handle member portion and carry the beverage container with the handle/lock assembly remaining locked.

When the handle/lock assembly 16 is rotated by the user into the unlocked position, as illustrated in FIGS. 2 and FIGS. 4-7, the bridge portion 111 of the lock member portion 118, is rotated away from the button 82 to a position below the button and does not block the user from operating the button. As such, the beverage container 10 is ready to be used for drinking a liquid/beverage stored within the beverage container body 14 upon both pressing the button 82 inward in the amount required to produce the desired ratio of additive and beverage to enter the mixing chamber 54, and tilting the beverage container for drinking the additive and/or beverage in the mixing chamber from upwardly extending wall portion 50 (the spout). The sequence can be first actuating the button and then tilting of the beverage container when at the mouth of the user, or first tilting of the beverage container when at the mouth of the user and then actuating the button.

In the unlocked position, the bridge portion 111 of the handle member portion 120 is rotated away from the cap 56 and the upwardly extending wall portion 50 (the spout) to allow room for the nose of the user when drinking from the spout.

A second alternative embodiment of the beverage container 10, much like the embodiments of FIGS. 1-18, is shown in FIGS. 19-24 (that correspond to FIGS. 5-7 and 9-11). Except as noted below, the second alternative embodiment uses the same construction as shown and described for the embodiments of FIGS. 1-18. In the second alternative embodiment, instead of using the slider gate 78 with a smooth upper side for engagement with the lower end perimeter portion 53 of the upwardly extending wall portion 50 described above, a seal 122 is attached to the slider gate 78 by overmolding it onto the slider gate 78. The seal 122 includes an accurate seal portion 122A that projects upwardly from the upper surface 81 of the slider gate 78. The arcuate seal portion 122A has an arcuate shape corresponding to the arcuate shape of an inward end portion 124 of a wall portion 126 of the upper wall portion 44 that projects laterally within the upwardly extending wall portion 50 (the spout) to provide an improved fluid seal between the slider gate 78 and the upper wall portion 44, when the slider gate is positioned such that the additive aperture portion 48A is closed and the beverage aperture portion 48B is open for drinking only additive-free beverage from the body cavity 17 of the beverage container body 14 (see FIG. 22, corresponding to FIGS. 5 and 8).

The seal 122 also includes left and right-side portions 122B and 122C, respectively, that extend along the length of the sides of the slider gate 78, and a leading-edge seal 122D that extends along the inward end 100 of the slider gate.

In the second alternative embodiment, the additive control aperture 96 has a larger, generally rectangular shape with an inward end 128 being outwardly curved, unlike the triangular shaped additive control aperture 96 described above having an apex area 97. This provides the additive control aperture 96 of the second alternative embodiment with a larger opening that helps breaking the surface tension of the additive when the beverage container 10 is tilted for drinking and the slider gate 78 is initially moved inward by the user to move the additive control aperture 96 into alignment with the additive aperture portion 48A. Thus, providing improved flow of the additive in the additive passageway 72 through the additive control aperture 96 and into the mixing chamber 54.

Figure 22:
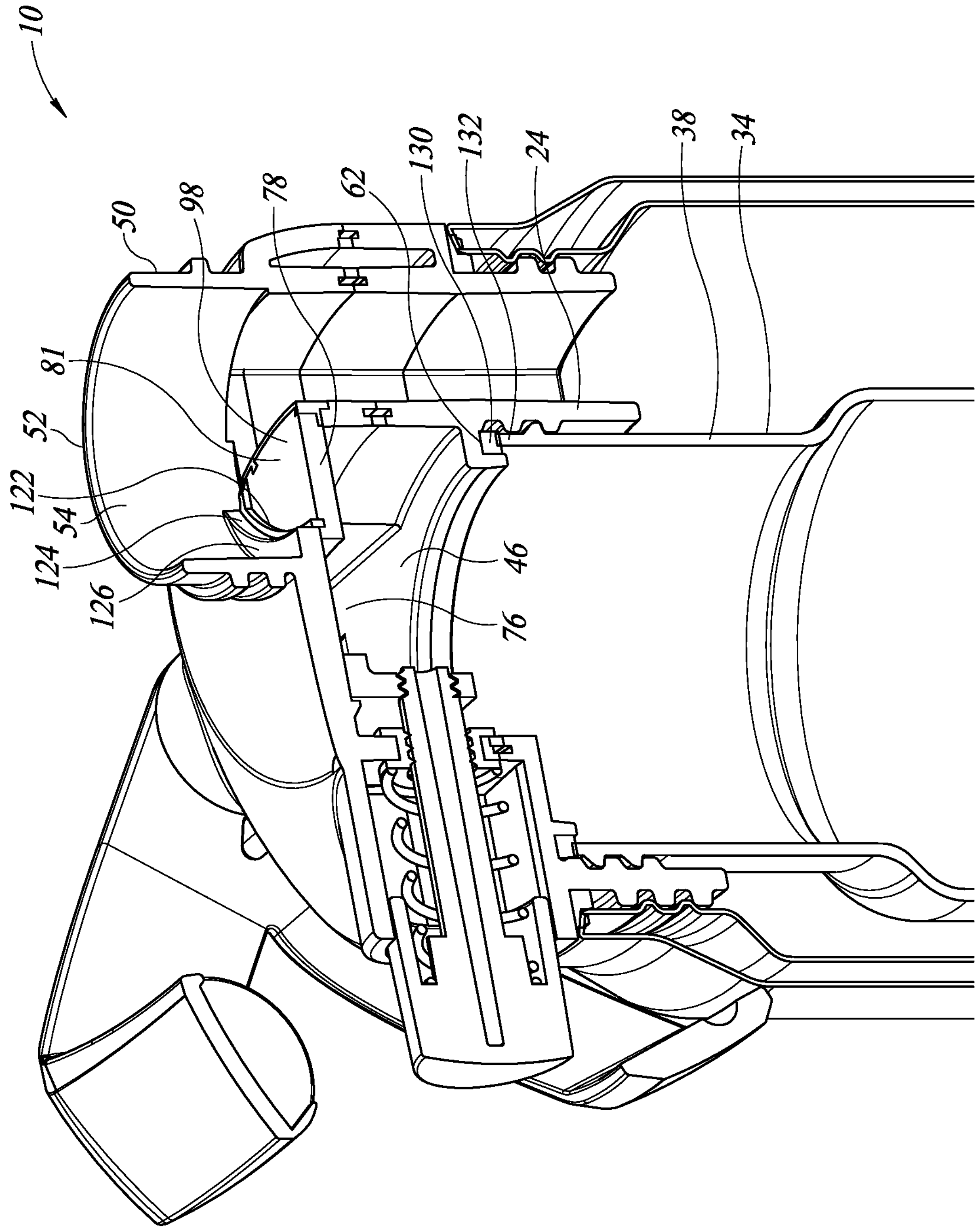
FIG. 22 is an enlarged, partial top perspective, cross-sectional view of the second alternative embodiment of the beverage container with the handle/lock assembly in the unlocked position and the alternative slider gate positioned for drinking the beverage without being mixed with the additive, corresponding to FIG. 5 of the first described embodiment.
Figure 23:
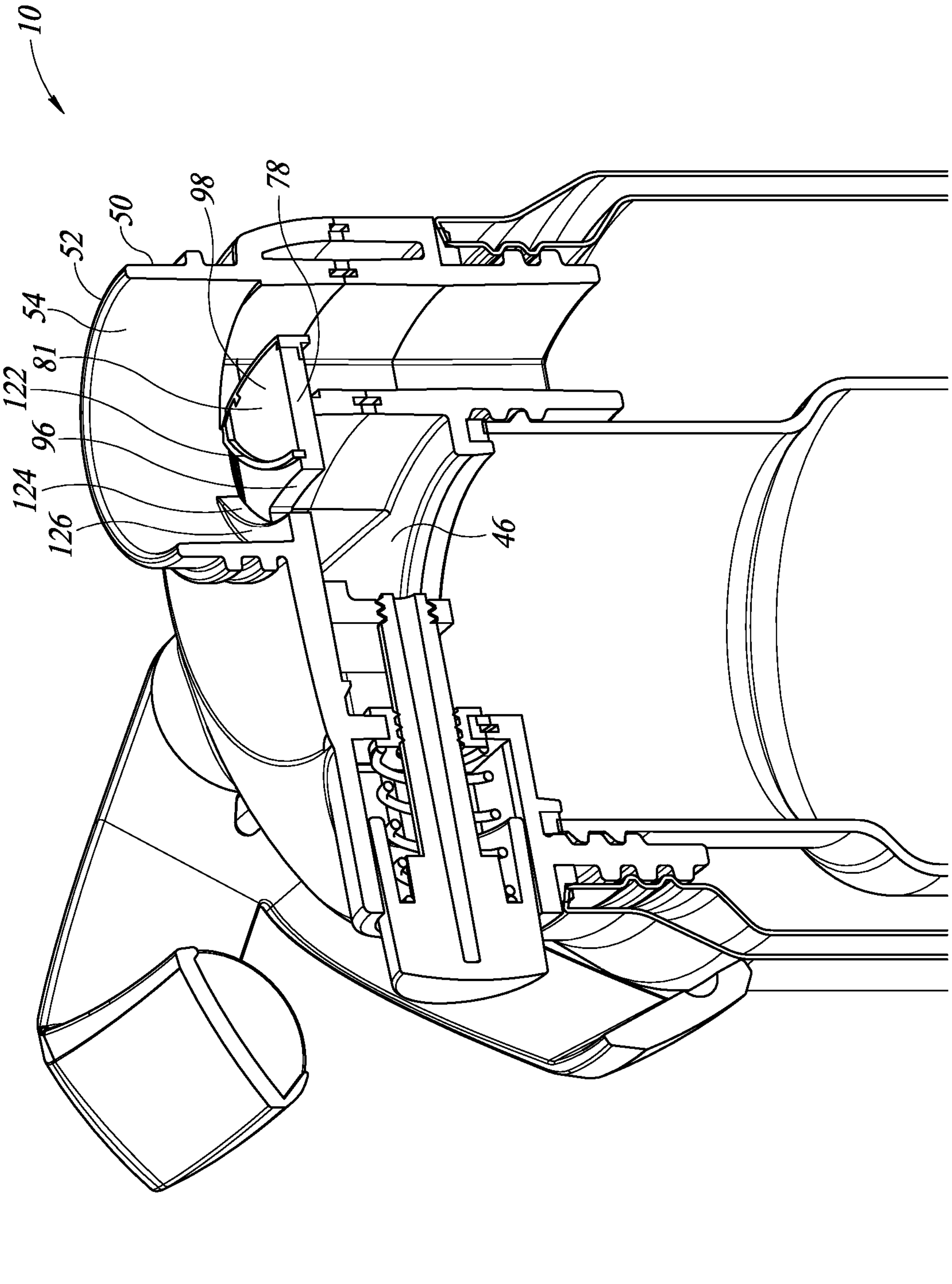
FIG. 23 is an enlarged, partial top perspective, cross-sectional view of the second alternative embodiment of the beverage container with the handle/lock assembly in the unlocked position and the button pressed inward to a position to move the alternative slider gate to a position for drinking the beverage after being mixed with some additive, corresponding to FIG. 6 of the first described embodiment.
Figure 24:
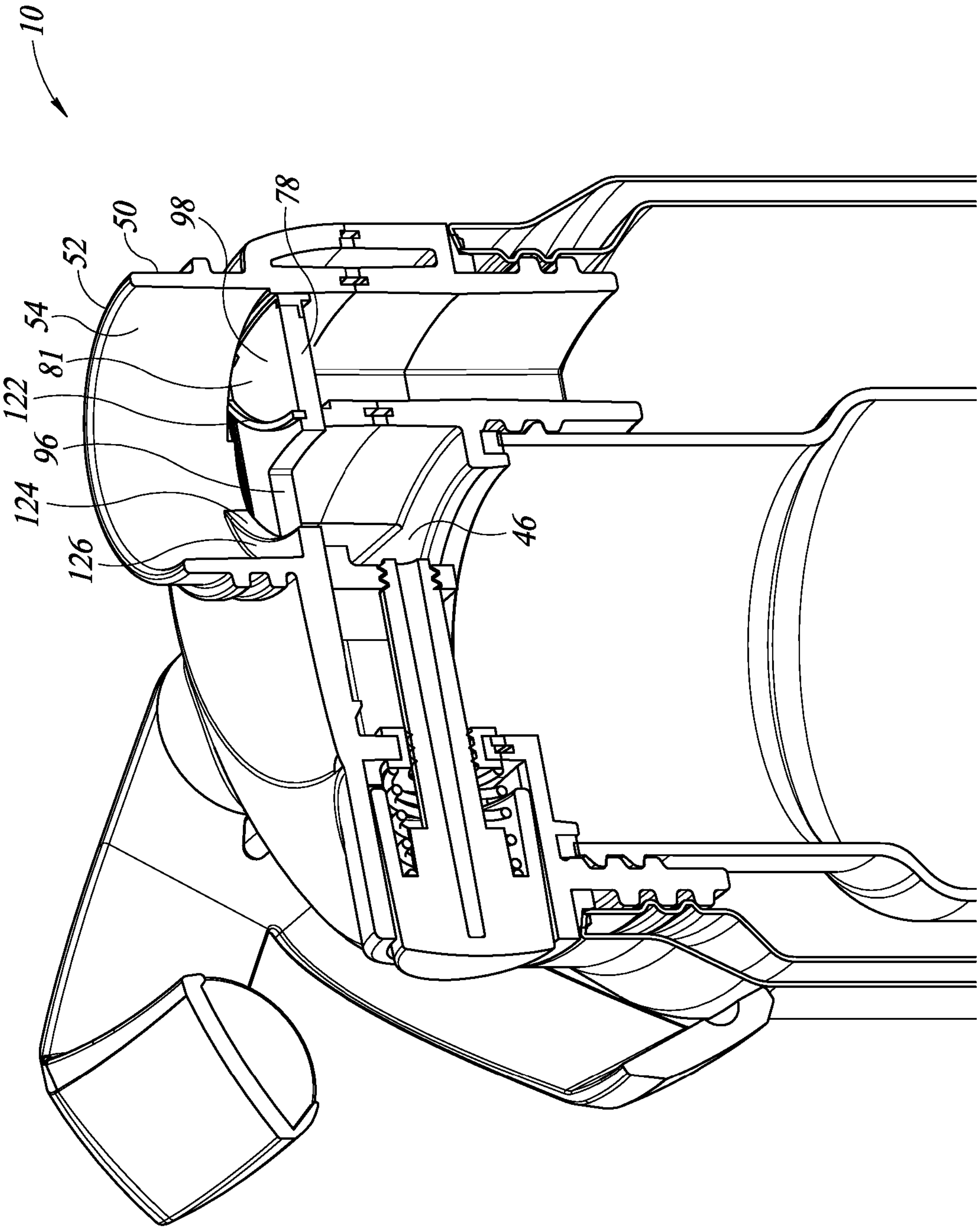
FIG. 24 is an enlarged, partial top perspective, cross-sectional view of the second alternative embodiment of the beverage container with the handle/lock assembly in the unlocked position and the button pressed farther inward than shown in FIG. 23 to move the alternative slider gate to a position for drinking only additive without being mixed with the beverage, corresponding to FIG. 7 of the first described embodiment.

In the second alternative embodiment, as shown in FIG. 22 (that corresponds to FIG. 5), instead of using the sealing element 64 described above, a circular flat seal 130 is positioned between the lower side 62 of the lower wall portion 46 and an upper end 132 of the upper end portion 38 of the additive reservoir 34, when the additive reservoir is attached to the lid lower body portion 24, to provide a fluid-tight seal therebetween.

In the second alternative embodiment, the lock member portion 118 and the handle member portion 120 are separated by an angularly offset "C" from each other of about 55 degrees.

While particular embodiments of the present invention have been shown and described, it will be obvious to those skilled in the art that, based upon the teachings herein, changes and modifications may be made without departing from this invention and its broader aspects.

The invention claimed is:

1. A lid usable with a beverage container and a refillable reservoir, the beverage container having an interior body cavity defined by a body sidewall with a sidewall upper end portion and a sidewall lower end portion, the sidewall upper end portion having an open upper end, and the sidewall lower end portion being sized to hold a beverage, the reservoir having a reservoir chamber sized to be inserted through the open upper end of the sidewall upper end portion and positioned at least partially within the interior body cavity of the beverage container, the reservoir chamber having a reservoir upper end portion, a reservoir lower end portion, the reservoir upper end portion having an open upper end, the reservoir lower end portion being sized to hold a beverage additive, comprising:

a lid body with a lid body upper portion and a lid body lower portion, the lid body lower portion being removably attachable to the reservoir upper end portion, the lid body lower portion being removably attachable to the sidewall upper end portion, the lid body upper portion having a mixing chamber, an additive passageway and a beverage passageway, the additive passageway extending between the mixing chamber and the open upper end of the reservoir chamber when the lid body upper portion is attached to the reservoir upper end portion to provide a flow of additive between the reservoir chamber and the mixing chamber, and the beverage passageway extending between the mixing chamber and the interior body cavity of the beverage container when the lid body lower portion is attached to the sidewall upper end portion of the beverage container to provide a flow of beverage between the interior body cavity and the mixing chamber; and a gate movable between first, second and third gate positions, (a) in the first gate position the gate closes off fluid communication between the additive passageway and the mixing chamber to block the flow of additive to the mixing chamber through the additive passageway, and provides fluid communication between the beverage passageway and the mixing chamber to permit the flow of beverage to the mixing chamber through the beverage passageway, (b) in the second gate position the gate provides fluid communication between the additive passageway and the mixing chamber to permit the flow of additive to the mixing chamber through the additive passageway, and provides fluid communication between the beverage passageway and the mixing chamber to permit the flow of beverage to the mixing chamber through the beverage passageway, to allow mixing of the additive and beverage reaching the mixing chamber, and (c) in the third gate position the gate provides fluid communication between the additive passageway and the mixing chamber to permit the flow of additive to the mixing chamber through the additive passageway, and closes off fluid communication between the beverage passageway and the mixing chamber to block the flow of beverage to the mixing chamber through the beverage passageway.

2. The lid of claim 1, wherein the second gate position comprises a plurality of selectable second positions, with each selectable second position providing a different ratio of the permitted flow of additive and beverage to the mixing chamber, to allow mixing of additive and beverage in the mixing chamber in a plurality of different ratios.

3. The lid of claim 2, wherein the gate is movable sequentially between the plurality of selectable second positions in first and second directions, when moved in the first direction the ratio of the permitted flow of additive and beverage to the mixing chamber progressively increases, and when moved in the second direction the ratio of the permitted flow of additive and beverage to the mixing chamber progressively decreases.

4. The lid of claim 1, wherein the gate is a slider gate slidably supported by the lid body upper portion.

5. The lid of claim 1, wherein the mixing chamber includes a drinking spout portion from which beverage and additive in the mixing chamber is drinkable by a user.

6. The lid of claim 1, wherein the lid further includes an actuator operably connected to the gate to move the gate between the first, second and third gate positions.

7. The lid of claim 6, wherein the mixing chamber includes a drinking spout portion from which beverage and additive in the mixing chamber is drinkable by a user, the actuator includes a manually operated button projecting outward of the lid body upper portion and pressable inward to move the gate between the first, second and third gate positions, and the lid further includes a handle-lock member pivotally attached to the lid body upper portion to permit selected rotation of the handle-lock member relative to the lid body upper portion, the handle-lock member includes a handle portion and a lock portion, the handle and lock portions rotating in unison when the handle-lock member is rotated relative to the lid body upper portion between first and second handle-lock member rotational positions, in the first handle-lock member rotational position the handle portion is positioned for grasping by the hand of a user and the lock portion is positioned at the button to inhibit inward movement of the button, and in the second handle-lock member rotational position the handle portion is positioned farther away from the drinking spout portion than when the handle-lock member is in the first handle-lock member rotational position and the lock portion is positioned away from the button to avoid inhibiting inward movement of the button.

8. The lid of claim 7, wherein the handle-lock member includes a first base portion and a second base portion, each being pivotally attached to the lid body upper portion on both opposing sides of the lid body upper portion, and wherein the handle and lock portions each have first and second end portions, the first end portions being rigidly attached to the first base portion and the second end portions being rigidly attached to the second base portion, the handle and lock portions extending upward and above the lid body upper portion being the first and second base portion.

9. The lid of claim 1, wherein the lid body lower portion is sized and shaped to be inserted through the open upper end of the sidewall upper end portion of the beverage container and positioned at least partially within the sidewall upper end portion of the beverage container.

10. A beverage container, comprising:

a beverage container body having an interior body cavity defined by a body sidewall with a sidewall upper end portion and a sidewall lower end portion, the sidewall upper end portion having an open upper end, and the sidewall lower end portion being sized to hold a beverage;

a refillable reservoir chamber sized to be inserted through the open upper end of the sidewall upper end portion and positioned at least partially within the interior body cavity, the reservoir chamber having a reservoir upper end portion and a reservoir lower end portion, the reservoir lower end portion being sized to hold a beverage additive; and a lid having:

a lid body with a lid body upper portion and a lid body lower portion, the lid body lower portion and the reservoir upper end portion being removably attachable together, the lid body lower portion and the sidewall upper end portion being removably attachable together, the lid body upper portion having a mixing chamber, an additive passageway and a beverage passageway, the additive passageway extending between the reservoir chamber and the mixing chamber to provide a flow of additive therebetween, and the beverage passageway extending between the interior body cavity and the mixing chamber to provide a flow of beverage therebetween; and a gate movable between first, second and third gate positions, (a) in the first gate position the gate closes off fluid communication between the additive passageway and the mixing chamber to block the flow of additive to the mixing chamber through the additive passageway, and provides fluid communication between the beverage passageway and the mixing chamber to permit the flow of beverage to the mixing chamber through the beverage passageway, (b) in the second gate position the gate provides fluid communication between the additive passageway and the mixing chamber to permit the flow of additive to the mixing chamber through the additive passageway, and provides fluid communication between the beverage passageway and the mixing chamber to permit the flow of beverage to the mixing chamber through the beverage passageway, to allow mixing of the additive and beverage reaching the mixing chamber, and (c) in the third gate position the gate provides fluid communication between the additive passageway and the mixing chamber to permit the flow of additive to the mixing chamber through the additive passageway, and closes off fluid communication between the beverage passageway and the mixing chamber to block the flow of beverage to the mixing chamber through the beverage passageway.

11. The beverage container of claim 10, wherein the second gate position comprises a plurality of selectable second positions, with each selectable second position providing a different ratio of the permitted flow of additive and beverage to the mixing chamber, to allow mixing of additive and beverage in the mixing chamber in a plurality of different ratios.

12. The beverage container of claim 11, wherein the gate is movable sequentially between the plurality of selectable second positions in first and second directions, when moved in the first direction the ratio of the permitted flow of additive and beverage to the mixing chamber progressively increases, and when moved in the second direction the ratio of the permitted flow of additive and beverage to the mixing chamber progressively decreases.

13. The beverage container of claim 10, wherein the gate is a slider gate slidably supported by the lid body upper portion.

14. The beverage container of claim 10, wherein the mixing chamber includes a drinking spout portion from which beverage and additive in the mixing chamber is drinkable by a user.

15. The beverage container of claim 10, wherein the lid further includes an actuator operably connected to the gate to move the gate between the first, second and third gate positions.

16. The beverage container of claim 15, wherein the mixing chamber includes a drinking spout portion from which beverage and additive in the mixing chamber is drinkable by a user, the actuator includes a manually operated button projecting outward of the lid body upper portion and pressable inward to move the gate between the first, second and third gate positions, and the lid further includes a handle-lock member pivotally attached to the lid body to permit selected rotation of the handle-lock member relative to the lid body upper portion, the handle-lock member includes a handle portion and a lock portion, the handle and lock portions rotating in unison when the handle-lock member is rotated relative to the lid body upper portion between first and second handle-lock member rotational positions, in the first handle-lock member rotational position the handle portion is positioned for grasping by the hand of a user and the lock portion is positioned at the button to inhibit inward movement of the button, and in the second handle-lock member rotational position the handle portion is positioned farther away from the drinking spout portion than when the handle-lock member is in the first handle-lock member rotational position and the lock portion is positioned away from the button to avoid inhibiting inward movement of the button.

17. The beverage container of claim 16, wherein the handle-lock member includes a first base portion and a second base portion, each being pivotally attached to the lid body on both opposing sides of the lid body, and wherein the handle and lock portions each have first and second end portions, the first end portions being rigidly attached to the first base portion and the second end portions being rigidly attached to the second base portion, the handle and lock portions extending upward and above the lid body upper portion being the first and second base portion.

18. The beverage container of claim 10, wherein the lid body lower portion is sized and shaped to be inserted through the open upper end of the sidewall upper end portion and positioned at least partially within the sidewall upper end portion.

19. The beverage container of claim 10, wherein the reservoir chamber is positioned within the interior body cavity laterally offset relative to the interior body cavity to define a side channel within the interior body cavity, and the beverage passageway is laterally offset from the additive passageway and in alignment and fluid communication with the side channel.

20. A lid usable with a beverage container and a refillable reservoir, the beverage container having an open upper end portion and an interior body cavity sized to hold a beverage, the refillable reservoir being sized to be inserted through the open upper end portion of beverage container and positioned at least partially within the interior body cavity of the beverage container, the reservoir having an open upper end portion and an interior body cavity sized to hold a beverage additive, comprising:

a lid body with a lid body upper portion and a lid body lower portion, the lid body lower portion being removably attachable to the open upper end portion of the reservoir, the lid body lower portion being removably attachable to the open upper end portion of the beverage container, the lid body upper portion having a mixing chamber, an additive passageway and a beverage passageway, the additive passageway extending between the mixing chamber and the open upper end portion of the reservoir when the lid body upper portion is attached to the open upper end portion of the reservoir to provide a flow of additive between the interior body cavity of the reservoir and the mixing chamber, and the beverage passageway extending between the mixing chamber and the interior body cavity of the beverage container when the lid body lower portion is attached to the open upper end portion of the beverage container to provide a flow of beverage between the interior body cavity of the beverage container and the mixing chamber; and a valve movable between first, second and third valve positions, (a) in the first valve position the valve closes off fluid communication between the additive passageway and the mixing chamber to block the flow of additive to the mixing chamber through the additive passageway, and provides fluid communication between the beverage passageway and the mixing chamber to permit the flow of beverage to the mixing chamber through the beverage passageway, (b) in the second valve position the valve provides fluid communication between the additive passageway and the mixing chamber to permit the flow of additive to the mixing chamber through the additive passageway, and provides fluid communication between the beverage passageway and the mixing chamber to permit the flow of beverage to the mixing chamber through the beverage passageway, to allow mixing of the additive and beverage reaching the mixing chamber, and (c) in the third valve position the valve provides fluid communication between the additive passageway and the mixing chamber to permit the flow of additive to the mixing chamber through the additive passageway, and closes off fluid communication between the beverage passageway and the mixing chamber to block the flow of beverage to the mixing chamber through the beverage passageway.

21. The lid of claim 20, wherein the second valve position comprises a plurality of selectable second positions, with each selectable second position providing a different ratio of the permitted flow of additive and beverage to the mixing chamber, to allow mixing of additive and beverage in the mixing chamber in a plurality of different ratios.

22. The lid of claim 21, wherein the valve is movable sequentially between the plurality of selectable second positions in first and second directions, when moved in the first direction the ratio of the permitted flow of additive and beverage to the mixing chamber progressively increases, and when moved in the second direction the ratio of the permitted flow of additive and beverage to the mixing chamber progressively decreases.

23. The lid of claim 20, wherein the valve is a slider gate slidably supported by the lid body upper portion.

24. The lid of claim 20, wherein the lid further includes an actuator operably connected to the valve to move the valve between the first, second and third valve positions.

25. The lid of claim 24, wherein the mixing chamber includes a drinking spout portion from which beverage and additive in the mixing chamber is drinkable by a user, the actuator includes a manually operated button projecting outward of the lid body upper portion and pressable inward to move the valve between the first, second and third valve positions, and the lid further includes a handle-lock member pivotally attached to the lid body to permit selected rotation of the handle-lock member relative to the lid body upper portion, the handle-lock member includes a handle portion and a lock portion, the handle and lock portions rotating in unison when the handle-lock member is rotated relative to the lid body upper portion between first and second handle-lock member rotational positions, in the first handle-lock member rotational position the handle portion is positioned for grasping by the hand of a user and the lock portion is positioned at the button to inhibit inward movement of the button, and in the second handle-lock member rotational position the handle portion is positioned farther away from the drinking spout portion than when the handle-lock member is in the first handle-lock member rotational position and the lock portion is positioned away from the button to avoid inhibiting inward movement of the button.

26. A lid usable with a container having first and second chambers for containing first and second fluids therein, respectively, the second chamber being located at least partially within the first chamber, the first and second chambers each having an open upper end portion, comprising:

a lid removably attachable to the open upper end portion of the second chamber and removably attachable to the open upper end portion of the first chamber, the lid having a mixing chamber, a first fluid passageway and a second fluid passageway, the first passageway extending between the mixing chamber and the first chamber when the lid is attached to the open upper end portion of the first chamber to provide a flow of the first fluid between the first chamber and the mixing chamber, and the second passageway extending between the mixing chamber and the open upper end portion of the second chamber when the lid is attached to the open upper end portion of the second chamber to provide a flow of the second fluid between the second chamber and the mixing chamber; and a valve movable between first, second and third positions, (a) in the first valve position the valve closes off fluid communication between the second passageway and the mixing chamber to block the flow of the second fluid to the mixing chamber through the second passageway, and provides fluid communication between the first passageway and the mixing chamber to permit the flow of the first fluid to the mixing chamber through the first passageway, (b) in the second valve position the valve provides fluid communication between the second passageway and the mixing chamber to permit the flow of the second fluid to the mixing chamber through the second passageway, and provides fluid communication between the first passageway and the mixing chamber to permit the flow of the first fluid to the mixing chamber through the first passageway, to allow mixing of the second fluid and first fluid that reaches the mixing chamber, and (c) in the third valve position the valve provides fluid communication between the second passageway and the mixing chamber to permit the flow of second fluid to the mixing chamber through the second passageway, and closes off fluid communication between the first passageway and the mixing chamber to block the flow of the first fluid to the mixing chamber through the first passageway.

27. The lid of claim 26, wherein the second valve position comprises a plurality of selectable second positions, with each selectable second position providing a different ratio of the permitted flow of the second fluid and the first fluid to the mixing chamber, to allow mixing of the second fluid and the first fluid in the mixing chamber in a plurality of different ratios.

28. The lid of claim 27, wherein the valve is movable sequentially between the plurality of selectable second positions in first and second directions, when moved in the first direction the ratio of the permitted flow of the second fluid and the first fluid to the mixing chamber progressively increases, and when moved in the second direction the ratio of the permitted flow of the second fluid and the first to the mixing chamber progressively decreases.

29. The lid of claim 26, wherein the valve is a slider gate slidably supported by the lid.

30. The lid of claim 26, wherein the lid further includes an actuator operably connected to the valve to move the valve between the first, second and third valve positions.

31. The lid of claim 30, wherein the mixing chamber includes a spout portion from which the first fluid and the second fluid in the mixing chamber are dispensable, the actuator includes a manually operated button projecting outward of the lid and pressable inward to move the valve between the first, second and third valve positions, and the lid further includes a handle-lock member pivotally attached to the lid to permit selected rotation of the handle-lock member relative to the lid, the handle-lock member includes a handle portion and a lock portion, the handle and lock portions rotating in unison when the handle-lock member is rotated relative to the lid between first and second handle-lock member rotational positions, in the first handle-lock member rotational position the handle portion is positioned for grasping by the hand of a user and the lock portion is positioned at the button to inhibit inward movement of the button, and in the second handle-lock member rotational position the handle portion is positioned farther away from the spout portion than when the handle-lock member is in the first handle-lock member rotational position and the lock portion is positioned away from the button to avoid inhibiting inward movement of the button.

32. The lid of claim 26, wherein the second chamber is positioned within the first chamber laterally offset relative to the first chamber to define a side channel within the first chamber, and the first passageway is laterally offset from the second passageway and in alignment and fluid communication with the side channel.

33. A lid usable with a container having first and second chambers for containing first and second fluids therein, respectively, the second chamber being located at least partially within the first chamber, the first and second chambers each having an open upper end portion, comprising:

a lid removably attachable to the open upper end portion of the second chamber and removably attachable to the open upper end portion of the first chamber, the lid having a first fluid passageway having a first exit aperture and a second fluid passageway having a second exit aperture, the first passageway being in fluid communication with the first chamber when the lid is attached to the open upper end portion of the first chamber to provide a flow of the first fluid between the first chamber and the first exit aperture, and the second passageway being in fluid communication with the second chamber when the lid is attached to the open upper end portion of the second chamber to provide a flow of the second fluid between the second chamber and the second exit aperture; and a valve movable between first and second positions, (a) in the first valve position the valve closes off fluid communication between the second passageway and the second exit aperture to block the flow of the second fluid to the second exit aperture through the second passageway, and provides fluid communication between the first passageway and the first exit aperture to permit the flow of the first fluid to the first exit aperture through the first passageway, and (b) in the second valve position the valve provides fluid communication between the second passageway and the second exit aperture to permit the flow of second fluid to the second exit aperture through the second passageway, and closes off fluid communication between the first passageway and the first exit aperture to block the flow of the first fluid to the first exist aperture through the first passageway.

34. The lid of claim 33, wherein the valve has an additional position in which the valve provides fluid communication between the second passageway and the second exit aperture to permit the flow of the second fluid to the second exit aperture through the second passageway, and provides fluid communication between the first passageway and the first exit aperture to permit the flow of the first fluid to the first exit aperture through the first passageway.

35. The lid of claim 33, wherein the second chamber is positioned within the first chamber laterally offset relative to the first chamber to define a side channel within the first chamber, and the first passageway is laterally offset from the second passageway and in alignment and fluid communication with the side channel.

* * * * *